US012618285B2

(12) United States Patent
Satrom et al.

(10) Patent No.: US 12,618,285 B2
(45) Date of Patent: May 5, 2026

(54) LIQUID CONTAINMENT DOOR WITH CONTINUOUS GASKET

(71) Applicant: PS Industries Incorporated, Grand Forks, ND (US)

(72) Inventors: James Satrom, Grand Forks, ND (US); Chad Joseph Rose, Grand Forks, ND (US); Nathan Joel Ueland, Grand Forks, ND (US); Daniel Thomas Satrom, Arvilla, ND (US)

(73) Assignee: PS INDUSTRIES INCORPORATED, Grand Forks, ND (US)

( * ) Notice: Subject to any disclaimer, the term of this patent is extended or adjusted under 35 U.S.C. 154(b) by 0 days.

(21) Appl. No.: 18/965,759

(22) Filed: Dec. 2, 2024

(65) Prior Publication Data

US 2025/0092736 A1 Mar. 20, 2025

Related U.S. Application Data

(63) Continuation of application No. 18/298,170, filed on Apr. 10, 2023, now abandoned, which is a (Continued)

(51) Int. Cl.
*E06B 7/23* (2006.01)
*E06B 9/00* (2006.01)

(52) U.S. Cl.
CPC .......... *E06B 7/2316* (2013.01); *E06B 7/2318* (2013.01); *E06B 2009/007* (2013.01)

(58) Field of Classification Search
CPC ........ B60J 5/0418; E06B 5/10; E06B 7/2316; E06B 7/2318; E06B 7/14; E06B 7/2305; (Continued)

(56) References Cited

U.S. PATENT DOCUMENTS 1,750,631 A 3/1930 Eaglesfield
1,842,734 A * 1/1932 Saives ....................... E05F 7/04 16/86 A (Continued)

FOREIGN PATENT DOCUMENTS

DE 102008023500 A1 5/2009
DE 102012106345 A1 1/2014

(Continued)

OTHER PUBLICATIONS

Presray D7S brochure available at the New York Build Expo on Mar. 3, 2020, 1 page.

(Continued)

*Primary Examiner* — Justin B Rephann
(74) *Attorney, Agent, or Firm* — Fredrikson & Byron, P.A.

(57) ABSTRACT

A pedestrian door system includes a door frame comprising a frame strike side, a frame hinge side, and a frame sealing surface that extends up each of the frame strike and frame hinge sides. A threshold extends between the frame strike and frame hinge sides and includes a base secured to a floor surface and a threshold sealing surface. A door panel includes a panel bottom side, a panel strike side, a panel hinge side, and a continuous gasket extending continuously along the panel bottom side and up each of the panel strike and panel hinge sides. A door hinge couples the panel hinge side to the frame hinge side and facilitates hinged movement of the door panel between an open position and a closed position in which the gasket seals against the frame sealing surface and the threshold sealing surface in a liquid-tight manner.

20 Claims, 14 Drawing Sheets

Related U.S. Application Data continuation of application No. 16/911,578, filed on Jun. 25, 2020, now abandoned.

(58) Field of Classification Search
CPC ........... E06B 2009/007; E06B 3/26343; E06B 3/26303; E06B 2003/26389; E06B 1/70
See application file for complete search history.

(56) References Cited

U.S. PATENT DOCUMENTS

| | | | |
|---|---|---|---|
| 2,060,608 | A | 11/1936 | Butler, Jr. et al. |
| 2,065,078 | A | 12/1936 | Lane |
| 2,108,137 | A | 2/1938 | Oftedal et al. |
| 2,129,381 | A | 9/1938 | Oftedal et al. |
| 2,440,764 | A | 5/1948 | Wilson |
| 3,055,969 | A | 9/1962 | Schaller, Jr. |
| 3,341,975 | A | 9/1967 | Tylisz |
| 3,566,541 | A | 3/1971 | Coulter |
| 3,603,035 | A | 9/1971 | Kaldenberg |
| 3,851,420 | A | 12/1974 | Tibbetts |
| 4,015,368 | A | 4/1977 | Court et al. |
| 4,123,071 | A | 10/1978 | Yamamoto |
| 4,385,580 | A | 5/1983 | Davidson |
| 4,441,278 | A | 4/1984 | Covey, III |
| 4,807,396 | A | 2/1989 | Heikkinen |
| 4,831,779 | A | 5/1989 | Kehrli et al. |
| 4,999,950 | A | 3/1991 | Beske et al. |
| 5,039,826 | A | 8/1991 | Newland |
| 5,095,657 | A | 3/1992 | Marsh |
| 5,517,788 | A | 5/1996 | Mcgough et al. |
| 6,219,971 | B1 | 4/2001 | Headrick |
| 6,289,635 | B1 | 9/2001 | Procton et al. |
| 6,401,398 | B1 | 6/2002 | Panayides et al. |
| 6,879,256 | B1 | 4/2005 | Redfern et al. |
| 7,877,940 | B2 | 2/2011 | Meeks et al. |
| 8,127,500 | B2 | 3/2012 | Meeks et al. |
| 8,240,090 | B2 * | 8/2012 | Meeks .................. E06B 7/2316 49/504 |
| 8,813,427 | B2 | 8/2014 | Meeks |
| 9,341,018 | B2 | 5/2016 | Helton |
| 9,624,716 | B2 | 4/2017 | Mitchell et al. |
| 10,337,239 | B2 | 7/2019 | Header |
| 2002/0069589 | A1 | 6/2002 | Bennett |
| 2004/0231255 | A1 * | 11/2004 | Silverman ................. E06B 3/64 52/204.597 |
| 2004/0250477 | A1 | 12/2004 | Butcher |
| 2007/0204530 | A1 | 9/2007 | Janesky |
| 2007/0227076 | A1 | 10/2007 | Braun |
| 2008/0010904 | A1 | 1/2008 | Meeks et al. |
| 2009/0025317 | A1 | 1/2009 | Wirz et al. |
| 2010/0325982 | A1 | 12/2010 | Bogenhagen et al. |
| 2011/0296777 | A1 * | 12/2011 | Matta ........................ E06B 1/60 52/745.15 |
| 2015/0075080 | A1 | 3/2015 | Ellingson |
| 2016/0153227 | A1 | 6/2016 | Martin et al. |
| 2017/0022750 | A1 | 1/2017 | Helton |
| 2017/0234060 | A1 | 8/2017 | Graetsch et al. |
| 2018/0163458 | A1 | 6/2018 | Header |
| 2020/0011127 | A1 | 1/2020 | Fernandez-Cuervo |

FOREIGN PATENT DOCUMENTS

| | | | |
|---|---|---|---|
| EP | 1361329 | A1 | 11/2003 |
| EP | 2915941 | A1 | 9/2015 |

OTHER PUBLICATIONS

International Patent Application No. PCT/US2021/039040, Invitation to Pay Additional Fees and Partial Search Report railed Oct. 20, 2021, 15 pages.
Installation Instructions for Curries Flood Resistant Door and Frame Assemblies, Curries Assa Abloy, believed to be publicly available prior to the filing date of the instant application, 5 pages.
Drawings for Pedestrian, PD-520 MILD, Serial No. RD471, PS Doors Manufacturing Division, believed to be publicly available more than one year prior to the filing date of the instant application, 2 pages.
Drawings for PD520-Door Sweep Installation Guide, PS Doors, believed to be publicly available more than one year prior to the filing date of the instant application, 1 page.
Reference Drawings for Aluminum Hinged Flood Door 120"W.C., PS Doors Manufacturing Division, believed to be publicly available more than one year prior to the filing date of the instant application, 2 pages.

* cited by examiner

LIQUID CONTAINMENT DOOR WITH CONTINUOUS GASKET

RELATED MATTERS

This application is a continuation of U.S. patent application Ser. No. 18/298,170, filed Apr. 10, 2023, which is a continuation of U.S. patent application Ser. No. 16/911,578, filed Jun. 25, 2020, now abandoned, the contents of both of which are incorporated herein by reference.

TECHNICAL FIELD

The disclosure relates to liquid-tight door systems.

BACKGROUND

In many instances, doors are generally used to separate one environment from another. While this may be as simple as separating one room in a building from another, this may also include separating an interior environment from an external environment that is subject to natural elements, or separating an environment that is to be protected from an environment that includes a liquid that could be detrimental if introduced into the environment that is to be protected. These doors can typically be in either a closed position, where the separation is intended to be in place by the presence of the door blocking passage from one environment to the other, or an open position, where passage is permitted through the area outlined by the frame of the door.

While doors in a closed position generally do an adequate job of preventing large, solid objects from passing from an environment on one side of the door panel to an environment on the other side of the door panel, the mechanics of a door opening and closing create issues with the prevention of liquid from passing through the open crevices of the door system, even when the door is in the closed position. For instance, the presence of hinges on the door and the need for the door panels to swing open and closed typically prevent formation of a liquid-tight seal, as the hinges space the door panels away from the frame, and a door must be spaced away from the floor such that the door does not scrape the floor as it moves between open and closed positions. Examples of when it is desirable to prevent liquid from passing through open crevices of a closed door include floods and liquid spills. This problem is only compounded with double doors, where there are two door panels that swing away from one another and latch either together or into a common center structure.

SUMMARY

In general, the disclosure describes a liquid containment barrier or a liquid containment door (hereinafter referred to collectively as a "liquid containment door"). A liquid containment barrier/door is designed in such a way that a continuous gasket system is installed onto the door panel to make a continuous length of gasket to create a liquid-tight seal between the door panel and threshold, and between the door panel and frame, up to the designed water protection level. The continuous gasket system may be a single gasket piece or multiple gasket pieces connected to one another.

In some instances, the liquid containment door may also be implemented into a door system with a low threshold. The low threshold has the benefit of allowing traffic through the doorway, such as foot traffic, carts, vehicles, or wheelchairs with little impedance. Low thresholds are generally preferred and often required by regulations, such as the Americans with Disabilities Act ("ADA"), which detail specific dimensional requirements of the threshold size and shape. The continuous length of gasket attached to the door panel allows the door panel to create a liquid-tight seal to the perimeter door frame (two vertical jambs and header) and across the bottom of the door where the gasket makes a seal to a low profile threshold (e.g., an ADA-compliant threshold). An additional benefit of the continuous gasket being attached to the door panel and not attached to the threshold is that the gasket is not exposed to damage by traffic through the doorway.

The liquid containment door can function as a normal use pedestrian door. Examples of pedestrian doors include walk doors, personnel doors, passage doors, entry doors, entrance doors, accessible entrance or passage doors, handicap accessible doors, and exit doors. The liquid containment door can perform as a flood barrier or a spill containment system or can perform any other similar function when in the closed and latched position. Further, the liquid containment door may be implemented into any other type of door system, such as a vertically hinged door system, a sliding door system, a double door system, a French door system, an automatic door system, a rotating door system, or any other door system that may move between open and closed positions.

In one example, the disclosure is directed to a pedestrian door system that includes a door frame comprising a frame strike side, a frame hinge side, and a frame sealing surface that extends at least partially up each of the frame strike side and the frame hinge side. The pedestrian door system further includes a threshold configured to extend between the frame strike side and the frame hinge side, the threshold including a base configured to be secured to a floor surface and a threshold sealing surface, wherein the threshold has an overall height of no greater than 20 millimeters. The pedestrian door system also includes a door panel comprising a panel bottom side, a panel strike side, a panel hinge side, and a continuous gasket extending continuously along the panel bottom side and at least partially up each of the panel strike side and the panel hinge side. The pedestrian door system further includes a door hinge configured to hingedly couple the panel hinge side of the door panel to the frame hinge side of the door frame and to facilitate hinged movement of the door panel relative to the door frame between an open position and a closed position in which the continuous gasket of the door panel seals against the frame sealing surface of the door frame and against the threshold sealing surface of the threshold in a liquid-tight manner.

In another example, the disclosure is directed to a door system that includes a door frame comprising a frame first side, a frame second side, and a frame sealing surface that extends at least partially up each of the frame first side and the frame second side. The door system further includes a threshold configured to extend between the frame first side and the frame second side, the threshold including a base configured to be secured to a surface and a threshold sealing surface. The door system also includes a door panel comprising a panel bottom side, a panel first side, a panel second side, and a panel sealing surface that extends along the panel bottom side and at least partially up each of the panel first side and the panel second side. The door system further includes a gasket that comprises a bulb-type gasket with holes defined in a wet side wall of the gasket, the holes being configured to receive liquid and/or air into an interior space within the bulb-type gasket. The door panel is movable relative to the door frame between an open position and a closed position in which the gasket is positioned between the panel sealing surface of the door panel and the frame sealing surface of the door frame and between the panel sealing surface of the door panel and the threshold sealing surface of the threshold to create a liquid-tight seal.

In another example, the disclosure is directed to a door system that includes a door frame comprising a frame strike side, a frame hinge side, and a frame sealing surface that extends at least partially up each of the frame strike side and the frame hinge side. The door system further includes a threshold configured to extend between the frame strike side and the frame hinge side, the threshold including a base configured to be secured to a floor surface and a threshold sealing surface, wherein the threshold has an overall height of no greater than 20 millimeters. The door system also includes a door panel comprising a panel bottom side, a panel strike side, a panel hinge side, and a continuous gasket extending continuously along the panel bottom side and at least partially up each of the panel strike side and the panel hinge side. The door system further includes a door hinge configured to hingedly couple the panel hinge side of the door panel to the frame hinge side of the door frame and to facilitate hinged movement of the door panel relative to the door frame between an open position and a closed position in which the continuous gasket of the door panel seals against the frame sealing surface of the door frame and against the threshold sealing surface of the threshold in a liquid-tight manner.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
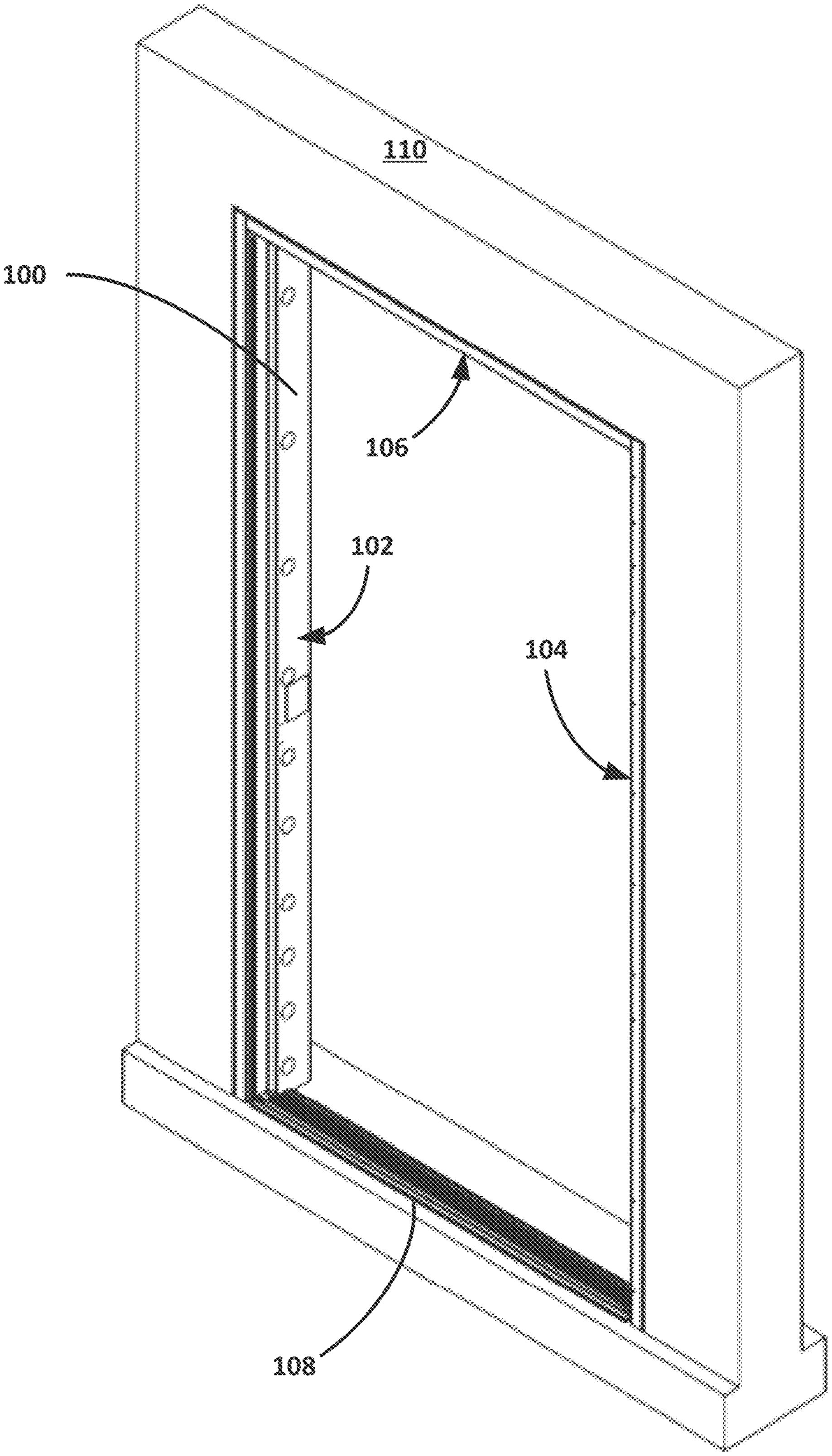
FIG. 1 is a perspective view of a door frame configured in accordance with one or more aspects of this disclosure.

In general, the disclosure describes a liquid containment barrier or a liquid containment door (hereinafter referred to collectively as a "liquid containment door"). A liquid containment door is designed in such a way that a continuous gasket system is installed onto the door panel to make a continuous length of gasket to create a liquid-tight seal between the door panel and threshold, and between the door panel and frame, up to the designed water protection level. The continuous gasket system may be a single gasket piece or multiple gasket pieces connected to one another. This disclosure may, in referencing the liquid containment aspects of the door referenced herein, use terminology related to "flooding." However, the application of the techniques and objects of this disclosure can extend beyond flood protection to such products as spill containment, or containment of any liquid. This disclosure may also refer to the application of the continuous gasket to a typical pedestrian or walk door, but examples of this disclosure can be applied to any type of door that hinges along its vertical side. Further, the continuous gasket described herein can be applied to any number of doors, including personnel doors, passage doors, entry doors, entrance doors, accessible entrance or passage doors, handicap-accessible doors, pedestrian doors, exit doors, or any other type of door that includes a threshold and frame as described herein. In some instances, door systems disclosed herein may not be for a pedestrian use, but for use with larger doors, such as stadium entries or entries to large commercial buildings.

As a preliminary note, it should be recognized that the various figures accompanying this application depict various parts of the overall door system. It should also be recognized that any individual figure may show only a certain subset of the features of the overall door system described herein. As such, when similar structures are described in different figures, it should be understood that those structures are interchangeable with the similarly named structures in other ones of FIGS. 1-11. Further, it should be understood that any of FIGS. 1-11 can be combined when analyzing how the figures fit together. For instance, door frame 100 may include frame strike side 102 and frame hinge side 104, which may be equivalent to frame strike side 402 and frame hinge side 404, respectively, which frame door panel 418, which may be equivalent to door panel 818. As such, when describing gasket 838 being installed on door panel 818, it should be understood that gasket 838 can also be present on door panel 418, although not shown, and that door panel 818 can be installed on door frame 100, although not shown. In other instances, each of FIGS. 1-11 may be interpreted in a standalone fashion, as there may be differences in some of the structures between FIGS. 1-11 (e.g., FIG. 4 depicting a single door system and FIG. 11 depicting a double door system).

FIG. 1 illustrates a door frame 100 configured in accordance with one or more aspects of this disclosure. Door frame 100 outlines a hole in wall 110. By including a hole in wall 110, objects and living beings are able to pass through wall 110 from one environment on a first side of wall 110 to a second environment on a second side of wall 110. Door frame 100 may also be configured to receive a door panel, such as door panel 418 of FIG. 4, door panel 518 of FIG. 5, or door panel 818 of FIG. 8. When door frame 100 includes a door panel, a user of the door panel may move the door from an open position, where objects and living beings are typically allowed to pass through the hole in wall 110, to a closed position, where objects and living beings are typically blocked from passing through the hole in wall 110. Door frame 100, as well as all parts of door frame 100 (e.g., frame strike side 102, frame hinge side 104, frame top side 106), may be made of any material suitable for the functions of the door frame described herein, including wood, metal, plastic, rubber, or any combination thereof.

Door frame 100 includes frame hinge side 104. Frame hinge side 104 typically attaches to the door panel using one or more hinges at various heights. The one or more hinges enable the door panel to hingedly rotate around frame hinge side 104 between open and closed positions.

Door frame 100 also includes frame strike side 102. Frame strike side 102 typically includes at least a part of a latching mechanism (e.g., latching mechanism 434 of FIG. 4). One or more parts of the overall latching mechanism may also be attached to the door panel installed in the door frame. The inclusion of the latching mechanism enables the door panel to remain in the closed position unless some predetermined amount of force in a particular direction is applied to the door panel or a portion of the door panel (e.g., a handle of the door panel). In some instances, frame strike side 102, either alone or in combination with one or more of frame top side 106 and frame hinge side 104, may prevent the door panel from hingedly rotating past a certain point, such as the point where the latching mechanism is enabled. This may be accomplished by frame strike side 102 extending away from door frame 100 and into the rotational path of the door panel and frame hinge side 104 (see, e.g., frame sealing surface 214 and stop surface 216 of FIG. 2A).

Door frame 100 also includes frame top side 106. Frame top side 106 may be located at some portion of wall 110 that is lower than the highest point on wall 110, or frame top side 106 may be aligned with the highest point on wall 110. In some instances, similarly to frame strike side 102, frame top side 106 may extend away from door frame 100 to prevent the door panel from hingedly rotating past a certain point.

The hole created in wall 110 may also create floor surface 108 at the bottom of the hole. In some instances, floor surface 108 may be part of door frame 100, while in other instances, floor surface 108 may be part of the building in which wall 110 is located.

Figure 2A:
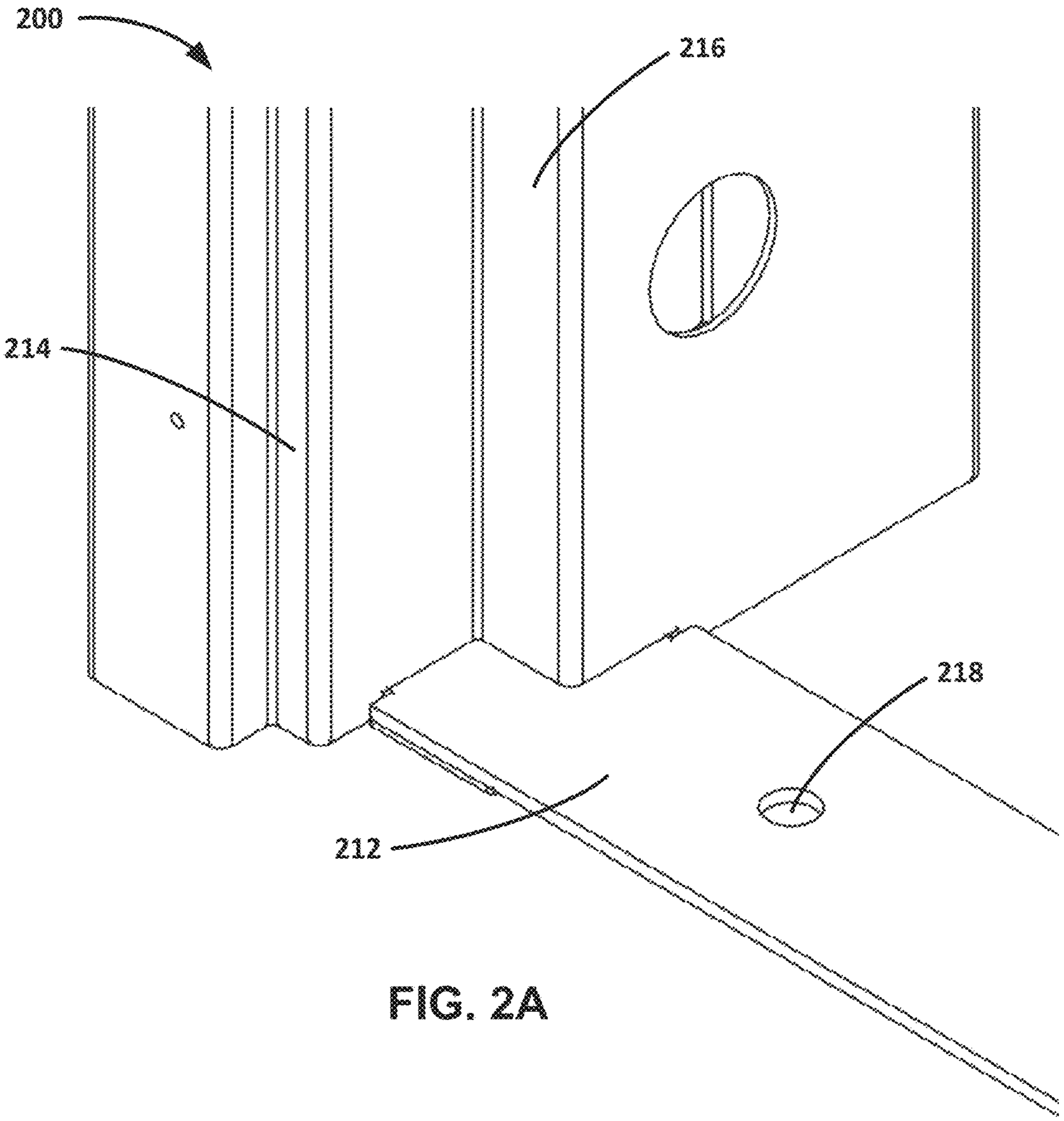
FIG. 2A is a perspective view of various frame surfaces configured in accordance with one or more aspects of this disclosure.
Figure 2B:
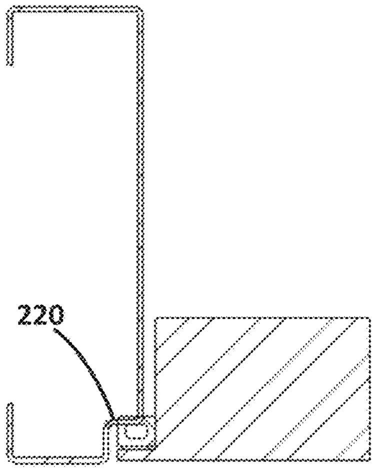
FIG. 2B is a schematic cross-sectional view of a door panel and door frame as configured in accordance with one or more aspects of this disclosure.

FIG. 2A illustrates various frame surfaces of door frame 200, configured in accordance with one or more aspects of this disclosure. In other words, FIG. 2A provides a zoomed-in perspective of a portion of door frame 200, which may be similarly constructed and have similar features to door frame 100 of FIG. 1.

In the example of FIG. 2A, door frame 200 includes frame base 212. Frame base 212 may sit atop a floor surface (e.g., floor surface 108 of FIG. 1) and provide a template for installing a threshold (e.g., threshold 736 of FIG. 7) into door frame 200. Frame base 212 includes hole 218, which may be designed to receive an anchor bolt to secure the threshold to frame base 212 and into the floor surface underneath frame base 212. Frame base 212 may not be present in all door systems. Instead, some instances may include the threshold being attached directly to the floor surface without the presence of frame base 212.

Figure 2C:
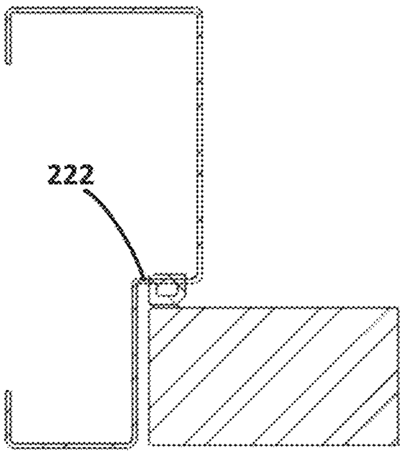
FIG. 2C is a schematic cross-sectional view of a door panel and door frame as configured in accordance with one or more aspects of this disclosure.

The vertical structures (frame sealing surface 214 and stop surface 216) in door frame 200 may be either of the frame hinge side or the frame strike side (e.g., frame strike side 102 and frame hinge side 104 of FIG. 1). In other words, both the frame hinge side and the frame strike side of a door frame in accordance with the techniques of this disclosure may include a frame sealing surface and a stop surface, as shown in FIG. 2A. In some instances, the frame sealing surface 214 and frame stop surface 216 may be one surface that creates both the door stop surface and the gasket sealing surface (surface 220 of FIG. 2B, surface 222 of FIG. 2C). In some such instances, the door panel may not include a flange, and the gasket (e.g., continuous bulb-type gasket) may be attached directly to the dry side of the door panel (FIG. 2C).

Stop surface 216 may be a portion of either the frame hinge side or the frame strike side that extends away from door frame 200 and into the hole in the wall or building created by door frame 200. Stop surface 216 is configured to restrict the movement of any door panel past stop surface 216 such that the door panel can only rotate from a closed position outward in one direction. Stop surface 216 may further be aligned in door frame 200 such that the door panel contacts stop surface 216, or is proximate to stop surface 216 (e.g., within 5 millimeters), when the latching mechanism of the frame strike side and/or the door panel is engaged to keep the door panel in a closed position.

Frame sealing surface 214 may be an additional portion of the frame strike side and/or frame hinge side that extends into the hole in the wall or building created by door frame 200. As shown, frame sealing surface 214 is shorter in length than stop surface 216, meaning that frame sealing surface 214 does not extend from door frame 200 into the hole in the wall created by door frame 200 as far as stop surface 216. This is because the door panel must be able to slide past frame sealing surface 214 as the door panel moves between open and closed positions. When the door panel moves into the closed position, a gasket (e.g., gasket 538 of FIG. 5 or gasket 838 of FIGS. 8A-8C) attached to the door panel, or the door panel itself, comes into contact with frame sealing surface 214, creating a liquid-tight seal between the environment on one side of the door panel and the environment on the second side of the door panel. In some instances, frame sealing surface 214 is made of the same material as door frame 200 (e.g., wood, metal, plastic, rubber, some combination thereof, etc.). In other instances, frame sealing surface 214 is a gasket itself, attaching to door frame 200 and the frame strike side or the frame hinge side, producing the liquid-tight seal with the door panel by coming into contact with the door panel when the door panel is in the closed position or by coming into contact with the gasket installed on the door panel when the door panel is in the closed position.

By being liquid-tight, the door system described herein may have zero leakage, or may have some small amount of leakage or seepage. Often flood barrier manufacturers acknowledge that, even for doors considered to be "watertight," there may be a small leakage rate. Regarding flooding, the Federal Emergency Management Agency (FEMA) defines "watertight" as "substantially impermeable to the passage of water."

Figure 3:
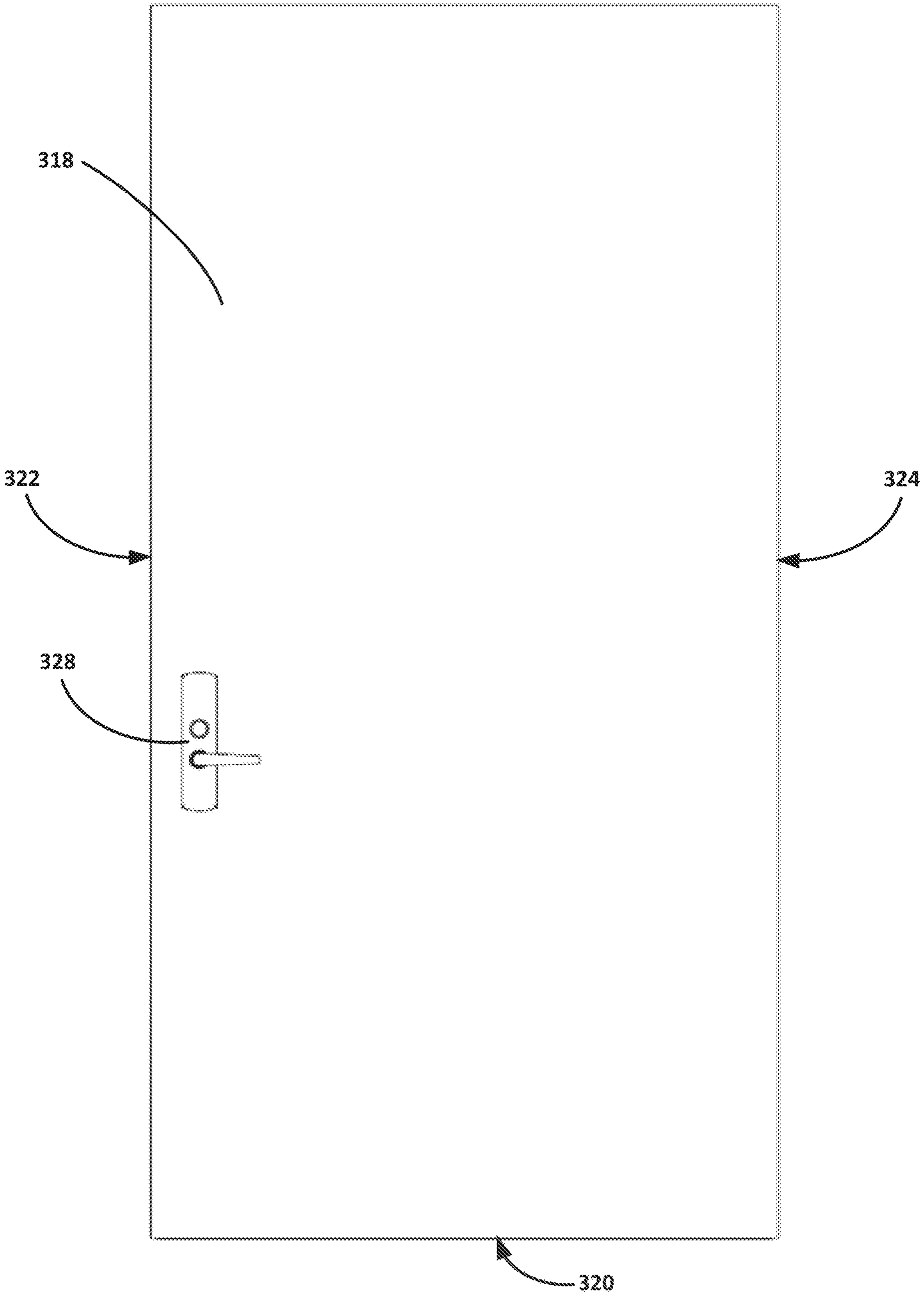
FIG. 3 is a wet-side view of a door panel as configured in accordance with one or more aspects of this disclosure.
Figure 4:
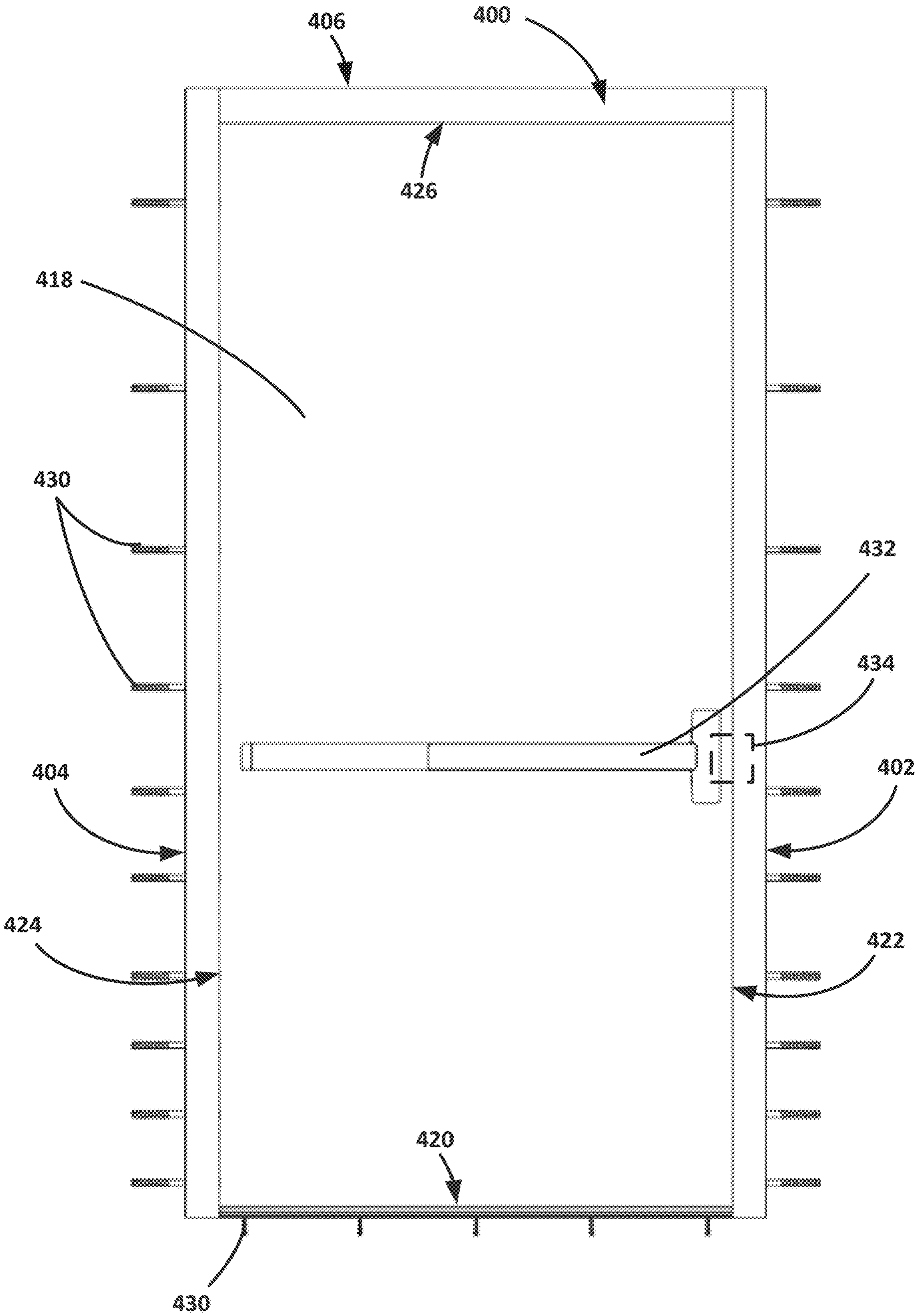
FIG. 4 is a view of a door panel and a door frame configured in accordance with one or more aspects of this disclosure.

FIG. 3 illustrates door panel 318 as configured in accordance with one or more aspects of this disclosure. Door panel 318 may be installed in a door frame, such as door frame 100 or door frame 200 of FIGS. 1 and 2, respectively. Door panel 318 may be made of any material suitable for a door, including wood, plastic, metal, rubber, a combination thereof, or any other material. FIG. 3 shows the wet side of door panel 318, though in many configurations the dry side of door panel 318 also has a door handle.

Door panel 318 includes panel bottom side 320, panel strike side 322, and panel hinge side 324. Panel bottom side 320, when door panel 318 is in a closed position, may be situated over a threshold (e.g., threshold 736 of FIG. 7). When door panel 318 rotates into the open position, panel bottom side 320 may swing above a floor surface that is below door panel 318.

Panel strike side 322 may be positioned to be on the same side of the door system as the frame strike side of the door frame that holds door panel 318 when door panel 318 is in the closed position. As such, panel strike side 322 may also be the same side of door panel 318 as latching mechanism 328. In the example of FIG. 3, latching mechanism 328 includes a rotatable handle that moves a mechanical latch inward into door panel 318 when rotated. When the rotatable handle of latching mechanism 328 is not moved, the mechanical latch remains protruding from door panel 318 and into the frame strike side portion that holds the receiver of the latching mechanism. This is merely one example of latching mechanism 328, and any other latching mechanism known to be used for doors can be used in place of latching mechanism 328 shown in FIG. 3. As another example, a multi-point vertical rod device may be used in which latch bolts engage into the header or the floor surface or both.

Panel hinge side 324 may be positioned to be on the same side of the door system as the frame hinge side of the door frame that holds door panel 318. As such, panel hinge side 324 may be on the same side of the door system as a door hinge. Door panel 318 may connect to the door frame, or the wall that holds the door frame, via the door hinge. The door hinge may be flexible, such that door panel 318 can hingedly rotate around the door hinge to move between open and closed positions.

FIG. 4 illustrates a door panel 418 (opposite surface as shown in FIG. 3) and door frame 400 configured in accordance with one or more aspects of this disclosure. Door frame 400 may be similarly constructed, and made of a similar material, as door frame 100 of FIG. 1 and/or door frame 200 of FIG. 2A. Similarly, door panel 418 may be similarly constructed, and made of a similar material, as door panel 318 of FIG. 3. FIG. 4 shows the dry side of door panel 418.

In the example of FIG. 4, door frame 400 includes frame strike side 402, frame hinge side 404, and frame top side 406. Door frame 400 may attach into a wall or a building (not shown) using anchor bolts 430. While the example of FIG. 4 shows 25 anchor bolts 430 to secure door frame 400 into the wall or building, other examples may include more or fewer anchor bolts. In some examples, other methods of attaching the door frame to a wall may be used, such as welds, screws, bolts, concrete anchors, and so on.

Door panel 418 may also include panel bottom side 420, panel strike side 422, panel hinge side 424, and panel top side 426. In some examples, door panel 418 may also include a gasket, such as gasket 538 of FIG. 5 or gasket 838 of FIG. 8.

In some examples, the frame sealing surface (214 of FIG. 2A) may extend along the entirety of frame strike side 402, frame top side 406, and frame hinge side 404. In other words, frame sealing surface may include the entire extent of the opening within door frame formed by frame strike side 402, frame hinge side 404, and frame top side 406. In such examples, door panel 418 may further include a panel top side, and the gasket may extend continuously along the entirety of panel strike side 422, panel top side 426, panel hinge side 424, and panel bottom side 420. In other words, in this example, the gasket may be a continuous gasket that forms a full perimeter around door panel 418.

In some examples, the frame sealing surface (214 of FIG. 2A) may extend at least partially up each of the frame strike side 402 and the frame hinge side 404. In this example, the gasket may be a continuous gasket that extends along panel bottom side 420 and partially up each of panel strike side 422 and panel hinge side 424 to provide a seal up to a predetermined liquid level. In some examples, the frame sealing surface does not extend along the frame top side 406 (e.g., doors designed to for liquid containment up to only a certain height).

As shown in FIG. 4, frame hinge side 404 and panel hinge side 424 are located on the same side of the door system. Similarly, frame strike side 402 and panel strike side 422 are located on the same side of the door system. Panel strike side 422 and frame strike side 402 may also include portions of latching mechanism 434. For instance, door panel 418 may include crash bar 432 (also commonly referred to as a push bar or a panic bar) situated in an offset manner such that it is closer to panel strike side 422 rather than panel hinge side 424. When crash bar 432 is pressed inward towards door panel 418, latching mechanism 434 retracts into door panel 418, enabling door panel 418 to be swung away from door frame 400 around hinges on the opposite side of door panel 418 and on frame hinge side 404 and panel hinge side 424. This is merely one example of a handle and latching mechanism for operating door panel 418, and any other type of handle and/or latching mechanism system can replace crash bar 432 and latching mechanism 434 of FIG. 4. In many examples, latching mechanism 434 may be a passive latching mechanism configured to hold door panel 418 in the closed position without separate manual activation. In some examples, latching mechanism 434 may be a cylindrical lockset, a mortised lockset, a multi-point lockset, a rim exit device, a deadbolt, or another suitable mechanism.

Figure 5:
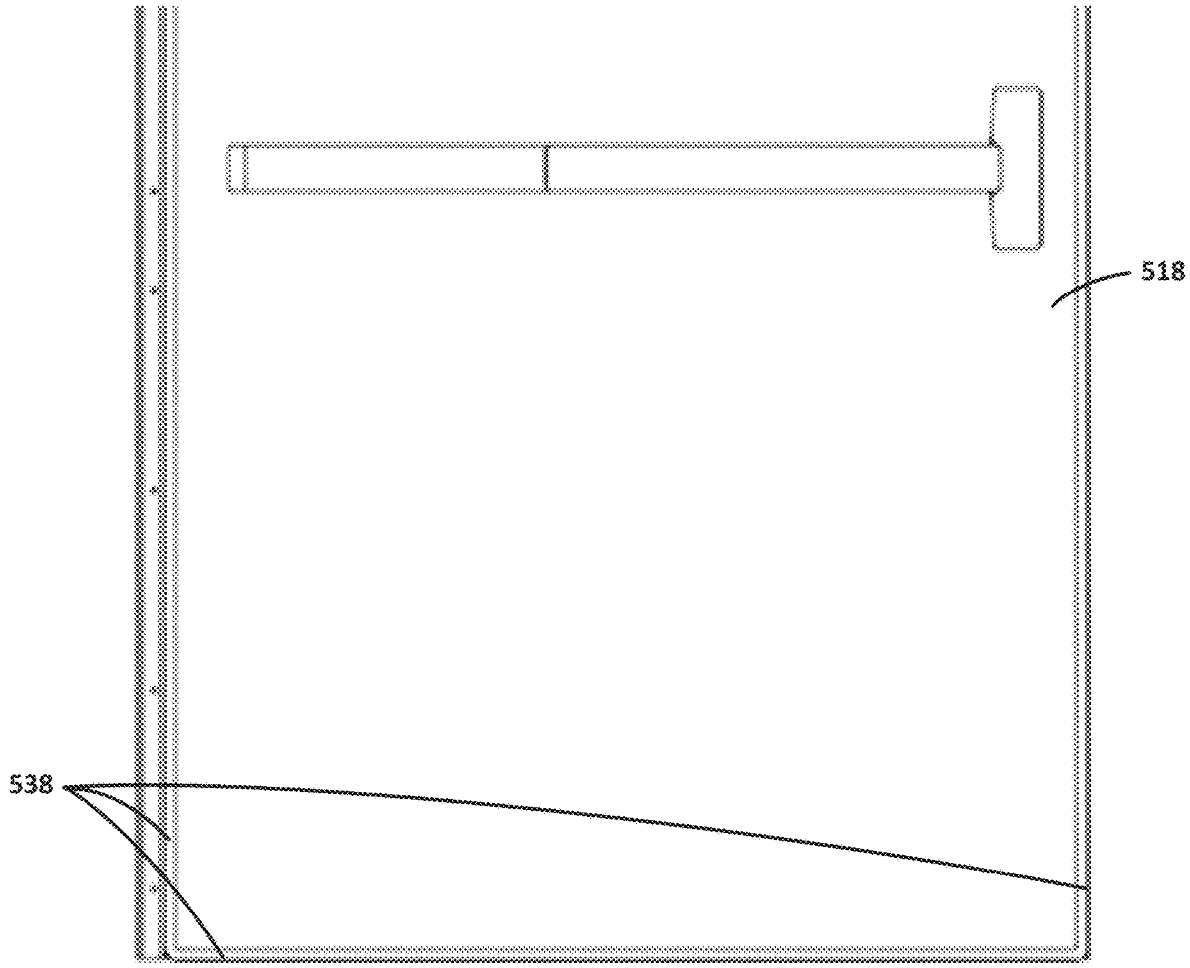
FIG. 5 is a dry-side view of a continuous gasket, a door panel, and a door frame configured in accordance with one or more aspects of this disclosure.

FIG. 5 illustrates gasket 538 and a dry side of a door panel 518 configured in accordance with one or more aspects of this disclosure. A low threshold liquid containment door is described herein.

The liquid containment door is designed in such a way that gasket 538 is installed onto the dry side of door panel 518 to make a continuous length of gasket (whether one piece, or multiple pieces connected) to create a liquid-tight seal between the door and the threshold (e.g., threshold 736 of FIG. 7), and between the door and frame strike side 402 and frame hinge side 404, up to the designed water protection level.

Door systems as described herein can function as a normal use "walk door," however it may also perform as a flood barrier, spill containment barrier, or any other liquid containment system with a similar function when the door is in the closed position. Latching can consist of any mechanism that will hold the door in in the closed position. Latching types can vary widely and can include standard commercial locksets and can be combined with door closers so that the door panel automatically swings and latches into the closed position. Other methods of latching may require manual engagement of devices that latch or further compress the gaskets to prepare the barrier for liquid containment. In addition to a liquid barrier, other requirements of typical "walk doors" can include any or none of the following: egress doors, panic doors, fire rated doors (e.g., fire-proof or doors graded to withstand certain temperatures), tornado rated doors (e.g., doors graded to withstand certain levels of force caused by a tornado), hurricane rated (e.g., doors graded to withstand certain levels of force caused by wind and/or hurricanes), sound rated doors (e.g., doors graded to block sound up to a certain decibel level), water intrusion rated (e.g., doors graded to block certain levels of water), and air infiltration rated (e.g., doors graded to have an airtight seal).

A continuous length of gasket (e.g., gasket 538) around the perimeter of a flood barrier allows a liquid-tight seal to made more easily and is more forgiving to field conditions and installation tolerances. Generally, there is a higher likelihood of water leakage anytime a flood gasket transitions over different materials or where multiple gaskets are joined together to create a liquid-tight seal. For example, a door system that has a bottom horizontal gasket attached to the door panel and vertical gaskets installed onto the door frame requires precise alignment and overlap of conjoining gaskets and metal sealing surfaces so that the liquid-tight seal can be made when the door is closed. Using a continuous length of gasket around the perimeter of the flood barrier creates a more simple and repeatable liquid-tight seal, especially if the gasket is installed on a planar surface (like a door panel surface) and seals to the surface of the door frame and threshold that are also aligned in a plane.

In some instances, in addition to, or in place of, gasket 538 installed on door panel 518, the frame and threshold gasket contact surfaces can be modified to have sealants or rubber type materials such as gaskets to improve the sealing surface for liquid-tightness. This can be especially useful for increasing the liquid-tightness in areas where the gasket sealing surface transitions from one part to another, such as the threshold to the vertical frame.

Gasket 538 provides multiple benefits over previous liquid containment systems. For instance, rather than use a bottom gasket situated on the door panel and remaining perimeter gaskets located on the frame, a continuous gasket as described herein removes the joints formed by the multiple gasket pieces coming together as the door is closed and breaking when the door is open. Further, rather than have the gasket installed to the frame and threshold that create a seal to the door panel, attaching the continuous gasket to the door panel removes the need for the gasket to extend into the walk space of the door. Even if the gasket does not extend into the walk space of the door, placing the gasket in the area (e.g., on the threshold) where traffic moves through means that wheels (such as those on wheelchairs or carts) and feet could hit the threshold as objects move through the space, causing wear, and therefore reducing the quality and effectiveness, of the gasket. Further, the continuous gasket described herein has the additional benefit of working with regulatory (ADA) wheelchair accessibility standards, combining the benefits of a liquid-tight door system with the accessible compliant door systems.

Also, unlike some other vertically hinged door products, the door system described herein does not require the bottom gasket to move downward into place to seal to a horizontal ground surface or small vertically raised surface. In such other systems, this is often achieved by moving the entire door panel downward to create downward pressure on compression gaskets or by implementing inflatable gaskets that increase in size and expand downward to seal downward to a flush or low threshold. Inflatable gaskets often require methods of operation that include air compressors or latching such as spin knobs and/or locking dogs. Known drawbacks of inflatable gaskets include cost, maintenance requirements, lifespan, and potential for catastrophic failures.

In accordance with the techniques and objects described herein, the continuous gaskets seal without the need for inflatable gaskets or the vertical movement of gaskets and/or the door panel. As such, the techniques and objects described herein provide an opening that meets low threshold dimensional requirements and overall height requirements, such as ADA wheelchair compliance standards or the United Kingdom equivalent (e.g., less than ¼ inch, ½ inch, ¾ inch, or 20 millimeters). The door described herein can act as a normal use door such as a typical pedestrian door for interior or exterior applications. The door described herein can also act as a passive flood barrier or manual flood barrier, depending on the type of lockset and door hardware.

The thresholds and gasket systems described herein may be compatible with other threshold height requirements, as well. For instance, Finland, Germany, France, and the Netherlands all state they allow a maximum threshold height of 20 millimeters to be handicap-accessible. The United Kingdom has a maximum threshold height of 15 millimeters. Canada states a maximum threshold height of 13 millimeters, and the United States provides a maximum threshold height of ½ inch. The techniques and door systems described herein may be compatible with any of these requirements. Door thresholds may also be referred to as door sills and/or door saddles.

Figure 6:
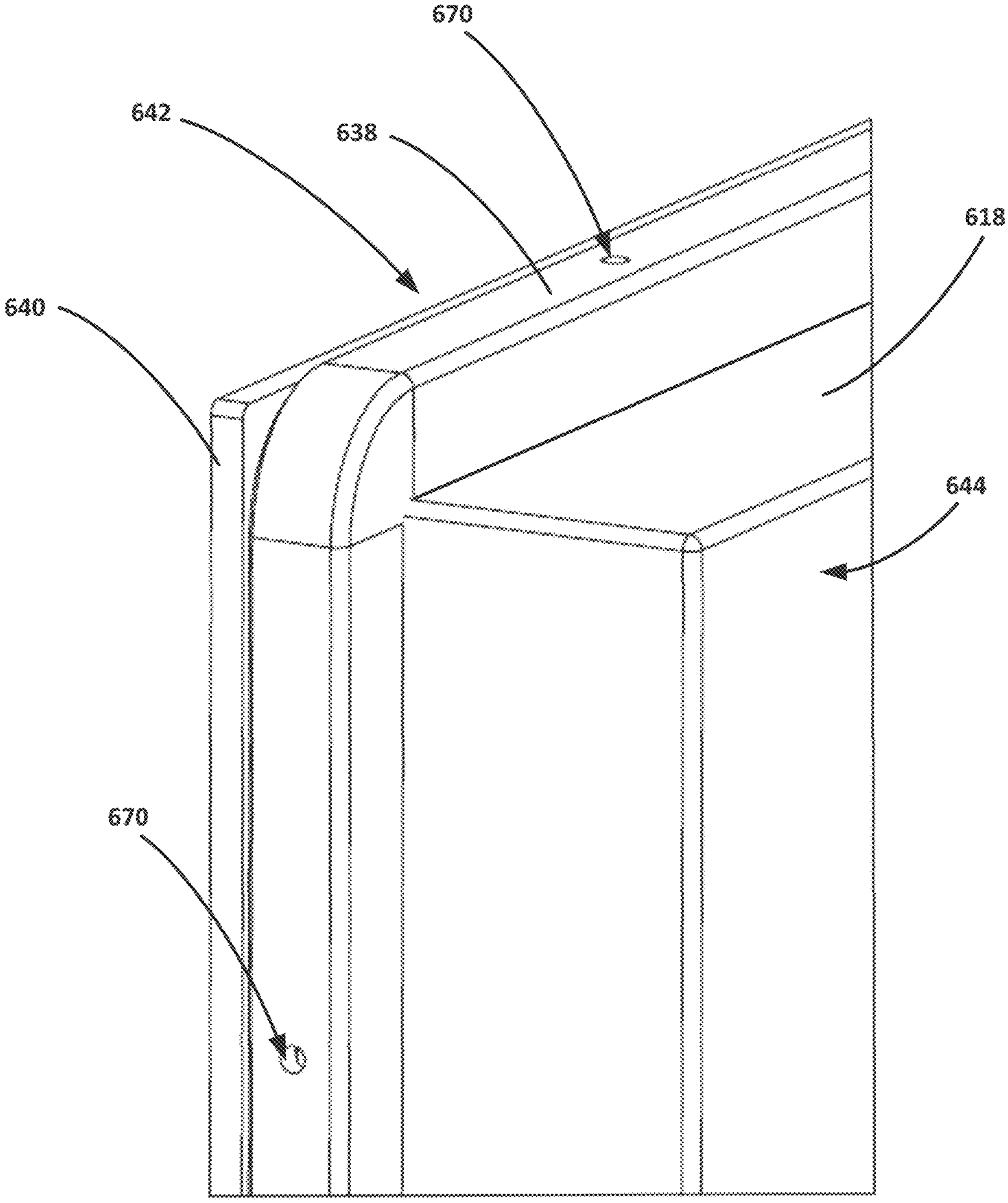
FIG. 6 is a perspective view of a continuous gasket attached to a door panel and configured in accordance with one or more aspects of this disclosure.

FIG. 6 illustrates gasket 638 attached to door panel 618 and configured in accordance with one or more aspects of this disclosure. As shown in FIG. 6, door panel 618 includes dry side panel 644, which may be situated on the side of door panel 618 facing the environment that is to be protected from flood, spill, or other liquid conditions. Door panel 618 also includes wet side panel 642, which may be situated on the side of door panel 618 facing the environment that potentially contains the liquid to be protected against.

In the example of FIG. 6, the edge of door panel 618 has door edge flange 640 that gasket 638 is attached to or located adjacent to. Gasket 638 may be made of any material suitably configured to provide the level of compression needed to create a liquid-tight seal, such as rubber, plastic, or any other resilient, waterproof material. Gasket 638 can be attached to door panel 618 such that water cannot fill the inside of door panel 618 and cause mold, mildew, saturate insulation, or cause corrosion. Gasket 638 can be positioned such that any liquid would encounter gasket 638 before encountering any seams in door panel 618. If water from flood waters penetrates the interior of door panel 618, the water pressure can create additional stresses on the structure of door panel 618, meaning that a more robust door panel structure is required. Gasket 638 reduces the need to manufacture a fully sealed door panel (often by seal welds, sealant, epoxy) to prevent liquid intrusion in the panel or further leakage through the entire barrier since the construction seams of the panel are not subjected to liquid pressure.

In some examples, liquid loads (e.g., hydrostatic, hydrodynamic and/or wave loading) on door panel 618 can be transferred to the door frame by direct bearing of a region of door panel 618 that is not at or directly adjacent to the gasket installation surface of door panel 618. Some liquid loading is still resisted by the hinge and gasket compression forces, but most loading is transferred to the "door stop" surface (see stop surface 216 of FIG. 2A) of the frame from the structural panel structure. Door panel 618 can transfer loading to the door frame in a way that limits the amount of force or compression on gasket 638, thus limiting the force transferred to the gasket attachment surface to limit the structural requirements of the gasket attachment surface. In other words, the attachment of gasket 638 to the door edge flange 640 of door panel 618 allows door edge flange 640 to be manufactured of a lighter duty material. In some instances, door edge flange 640 is created by a continuation of the wet side surface of door panel 618. In some instances, the wet side of door panel 618 is made of sheet metal and is extended outwardly from door panel 618 to create the wet side of door edge flange 640. In another example, door flange 640 can be created by hemming the portion of sheet metal extending from the edges of door panel 618 to create door edge flange 640 with a smooth, radiused edge. In instances where the full water loads of door panel 618 are transferred through door edge flange 640, door edge flange 640 should be made much more structural, which may be less economical and less aesthetically acceptable for applications where the door system must perform as a pedestrian door.

Gasket 638 can be installed on door edge flange 640 of the door that is recessed from dry side panel 644 so that door edge flange 640 us more protected from damage and more aesthetically pleasing. In the case of fire-rated doors, the recessed nature of gasket 638 may make the doors more likely to pass the UL10C fire test criteria by preventing exposed flaming of the gaskets to the non-fire side of the door panel. As the door swings closed, the location of gasket 638 close to the wet side panel 642 allows gasket 638 to move at a more perpendicular movement towards the opposing frame sealing surface of the door frame. This allows better forward compression of gasket 638 rather than gasket 638 rolling or sliding into position laterally. The hinge pivot position additionally contributes to this function.

In the case of gaskets that have a bulb-type closed section profile (e.g., the gasket is hollow in center), all or portions of gasket 638 can optionally be fabricated with holes 670 through the core wall of gasket 638 and allow air or water to move freely from the wet-side of gasket 638 to the inner hollow core of gasket 638. Holes 670 can be along the length of gasket 638 (e.g., 6 inches on center, 9 inches on center, 12 inches on center, or any other spacing) or can be in the form of a single or multiple holes (e.g., a slit, a notch, an open end of gasket, or any other means of allowing passage of liquid freely from inside and out of the gasket hollow core to the "wet-side" of a liquid barrier door). This allows flood water to enter the inside of gasket 638 and exert hydrostatic pressure (equivalent to the flood water depth hydrostatic pressure) on the inside of gasket 638 towards the opposing frame sealing surface.

If a gasket design has a bulb-type profile (the gasket is hollow in the middle), then holes drilled through the gasket wall into the hollow core can allow water to enter the hollow core of the gasket. The water pressure can press the gasket onto its sealing surface. The bulb-type gasket can have more lateral stability when loaded by water and better forming characteristics when installing around corners of a door panel (e.g., less puckering). When liquid fills the hollow core of a bulb-type gasket through the holes, that liquid can neutralize the pressure applied by liquid outside the gasket's hollow core, which can significantly reduce crushing or crumpling. When a door panel is being closed for the purpose of acting as a liquid barrier, the gasket may allow air to escape from its hollow internal core through the vent holes when it is compressed between the door and frame, which allows the gasket to achieve more initial compression deflection. Initial gasket compression is generally achieved by the swinging momentum of a door that compresses the gasket and automatically latches into the closed position or by a manual method of engaging latching that creates initial gasket compression by drawing the door closer to the frame such as spin-knob latches, or quarter-turn latches. Initial gasket compression is the compression of the gasket that is required to allow the door to act as a liquid containment barrier prior to liquid loads further compressing the door panel into the door frame. Initial gasket compression is one of the largest challenges of creating a liquid-tight door when latching methods are limited to standard commercial door closers and locksets, where the door swing momentum must compress gasketing and latch the door closed without additional human intervention (e.g., creating a "passive" flood barrier).

Gaskets can take various forms. As noted, the gasket can be a bulb-type design. In some instances, the gasket can be solid, with no hollow core. In some examples, the gasket can be made of dense rubber or foam. Gaskets can be extruded to have various cross-sectional profiles.

Figure 7:
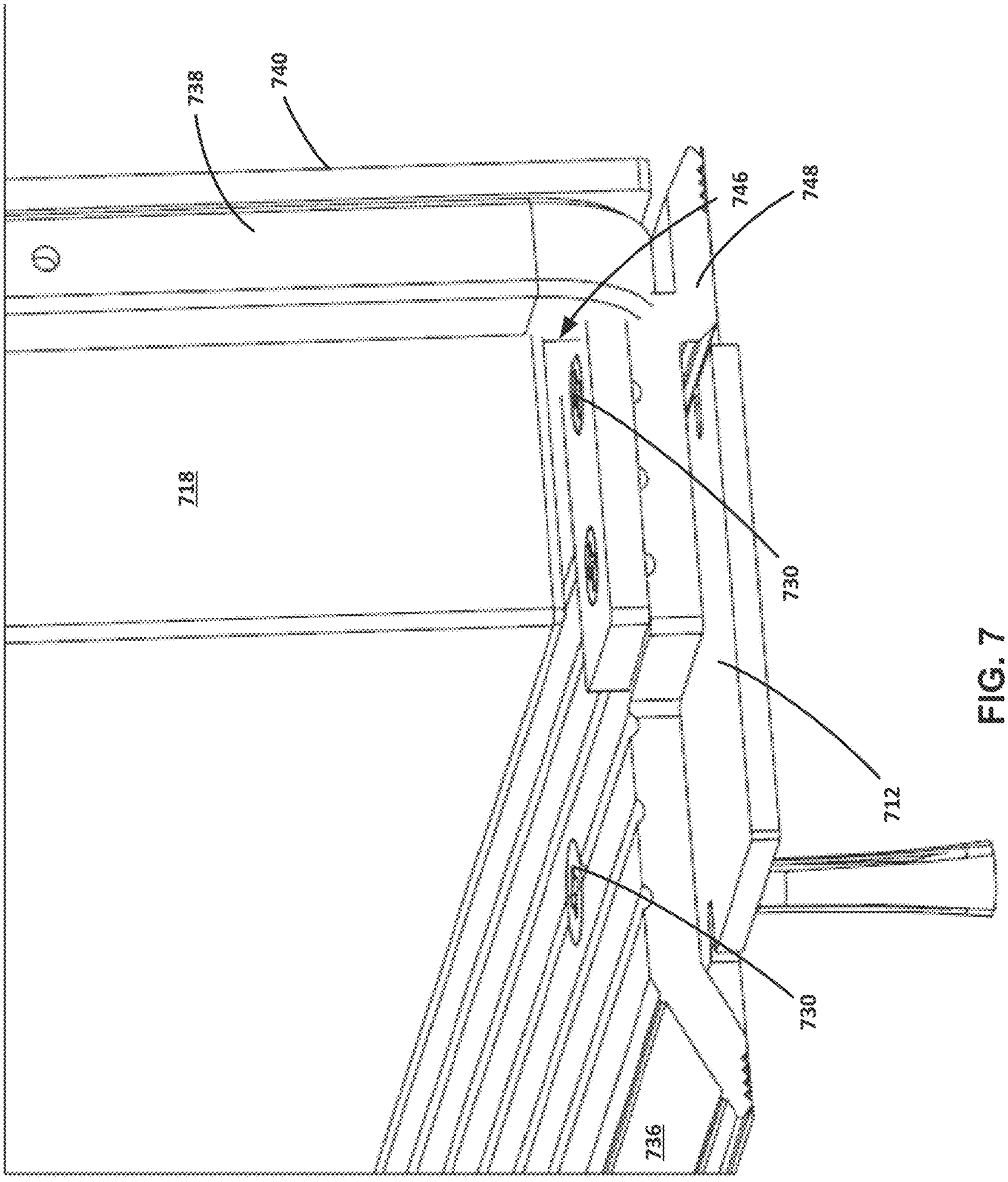
FIG. 7 is a perspective view of a door system that includes a door panel, a continuous gasket, and a threshold, each configured in accordance with one or more aspects of this disclosure.

FIG. 7 illustrates a door system that includes door panel 718, gasket 738, and threshold 736, each configured in accordance with one or more aspects of this disclosure. Door panel 718 may be similar to any of, and may be constructed of a similar material as, any of door panels 318, 418, 518, and/or 618. In the example of FIG. 7, door panel 718 includes door edge flange 740 that extends from the edges of door panel 718. Gasket 738 can be attached to door edge flange 740 or attached to door panel 718 in a way that allows gasket 738 to be located adjacent to door edge flange 740.

Threshold 736 is attached to a floor surface via frame base 712, which provides the template for drilling anchor bolts 730 through threshold 736 and frame base 712 and into the floor surface. In this way, threshold 736 is secured to the floor surface and provides threshold sealing surface 746 for the purpose of creating the liquid-tight seal. For instance, when door panel 718 is in the closed position, gasket 738 comes into contact with and exerts force on threshold sealing surface 746 above threshold base 748, as well as the frame sealing surfaces of the door frame. This continuous area of contact with adequate pressure creates the liquid-tight seal in accordance with the techniques of this disclosure. Threshold sealing surface 746 can be any portion of threshold 736. In many examples, there may be a clear demarcation between threshold base 748 and threshold sealing surface 746. In other examples, threshold sealing surface 746 will be part of threshold base 748.

Threshold 736 may be made of any material durable to handle foot traffic, wheel traffic, or any other traffic that may pass over threshold 736. For instance, threshold 736 may be made of aluminum, but may also be made of any other suitable material, such as wood, plastic, rubber, or any combination thereof. Threshold 736 may also include ribs or grooves, to increase the friction of threshold 736 and to reduce any slipping that may occur from stepping on threshold 736.

Figure 8A:
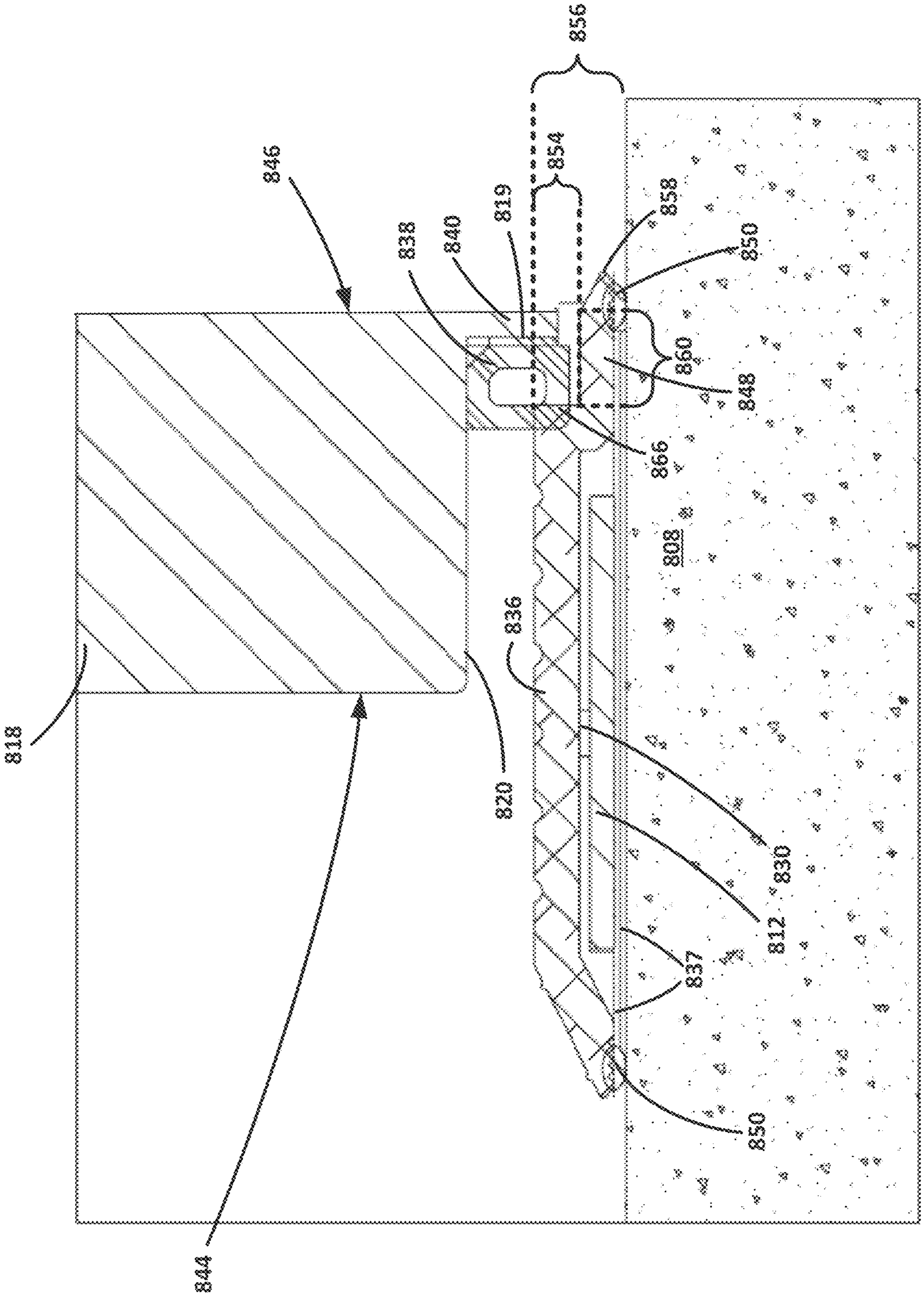
FIGS. 8A-8B are section views of a door system that includes a door panel, a continuous gasket, and a threshold, each configured in accordance with one or more aspects of this disclosure.
Figure 8B:
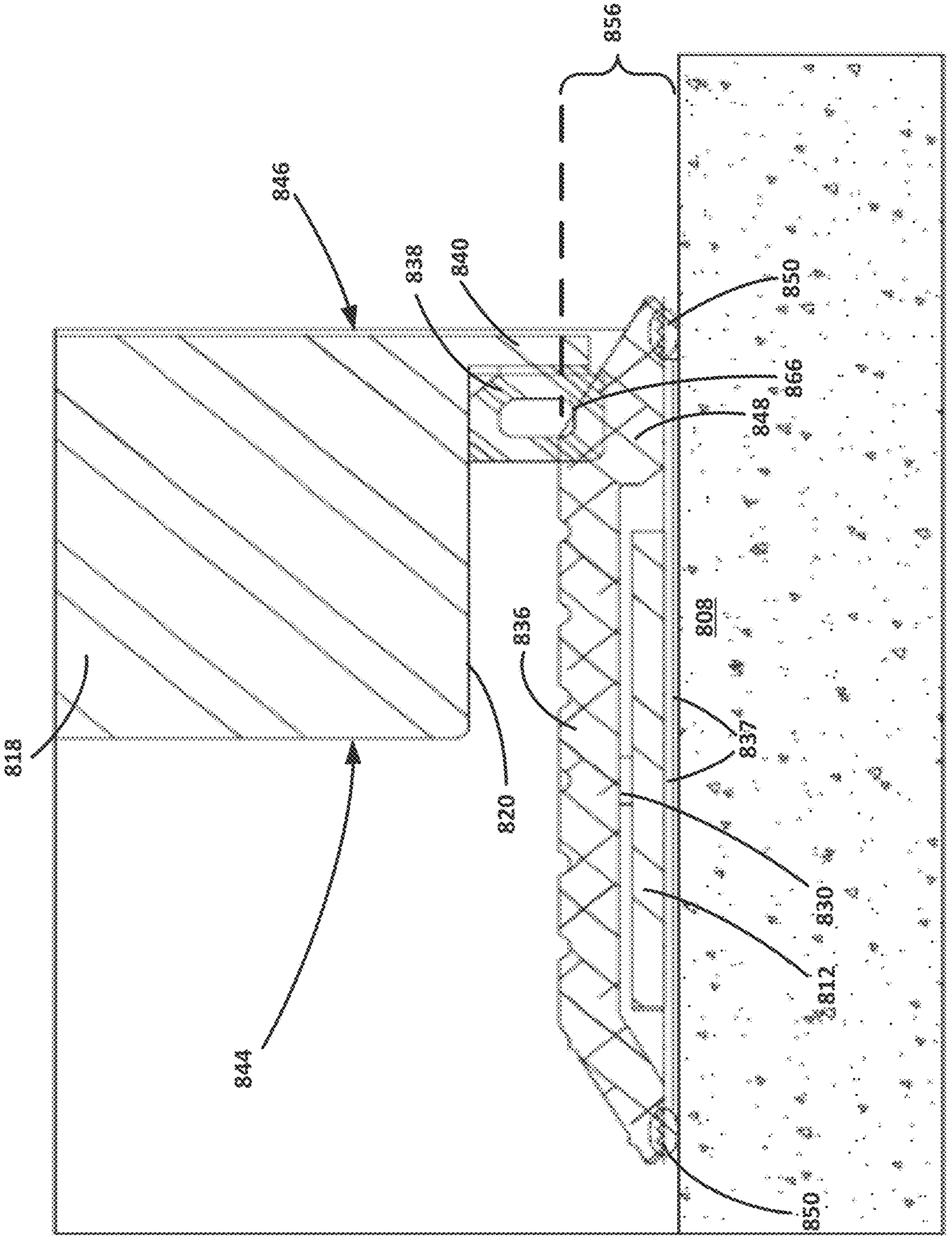

FIGS. 8A-8B illustrate a door system that includes a door panel 818, a continuous gasket 838, and a threshold 836, each configured in accordance with one or more aspects of this disclosure. Gasket 838 and door panel 818 may be installed as part of a door system as described elsewhere in this disclosure, such as the door systems of FIGS. 1-7. As such, reference may be made to the door systems of FIGS. 1-7 in describing the environment in which gasket 838 and door panel 818 are installed.

In each of FIGS. 8A-8B, door panel 818, similar to previous door panels described herein, includes dry side panel 844 and wet side panel 846. Door panel 818 also includes door edge flange 840, which gasket 838 is attached to. Threshold 836 is attached to floor surface 808 via sealant 850 and anchor bolt 830. Anchor bolt 830 is threaded through threshold 836 and frame base 812 to secure each of threshold 836 and frame base 812 to floor surface 808. Threshold 836 provides threshold sealing surface 866 for the purpose of creating the liquid-tight seal. For instance, when door panel 818 is in the closed position, gasket 838 comes into contact with and exerts force on threshold sealing surface 866 above threshold base 848, as well as the frame sealing surfaces of the door frame. This continuous area of contact with adequate pressure creates the liquid-tight seal in accordance with the techniques of this disclosure.

In accordance with the techniques described herein, a pedestrian door system includes door frame 100 comprising frame strike side 402, frame hinge side 404, and frame sealing surface 214 that extends at least partially up each of frame strike side 402 and frame hinge side 404. In other words, frame sealing surface 214 is a bottom portion of frame strike side 402 and frame hinge side 404 that starts at the bottommost edge of frame strike side 402 and frame hinge side 404 and extends upwards to the level at which the door system is intended to provide a liquid-tight seal. This may be some number of inches, feet, or the entirety of frame strike side 402 and frame hinge side 404.

The pedestrian door system also includes threshold 836 configured to extend between frame strike side 402 and frame hinge side 404. Threshold 836 includes threshold base 848 configured to be secured to floor surface 808 and threshold sealing surface 866. In some instances, threshold 836 has an overall height 856 from the floor surface 808 to the uppermost surface of the threshold 836 (irrespective of any beveled edges) of no greater than 20 millimeters. In other instances, threshold 836 may have an overall height 856 that is greater than or less than 20 millimeters. Threshold 836 may have an overall height 856 that is no greater than ¾ inch. In other instances, threshold 836 may have an overall height 856 of no greater than ½ inch. In still other instances, threshold sealing surface 866 may extend upwardly from threshold base 848 by a vertical distance 854 of no greater than ¼ inch. Threshold sealing surface 866 may either extend vertically from threshold base 848 or at a sloped angle.

In some instances, threshold 836 may be configured to reduce tripping hazards and make wheelchair access easier by having a sloped or tapered profile (e.g., FIG. 8B). In some examples, the upper corners of threshold 836 may be rounded, beveled, or sloped at a certain ratio to create a gradual transition for traffic passing perpendicularly over the threshold.

In some instances, all portions of threshold 836 that extend more than a predetermined height (e.g., ¼ inch) above floor surface 808 may have a rise:run ratio or maximum slope ratio such that the upper portion of threshold 836 does not rise too steeply and pose a tripping hazard or impede wheelchair traffic. In instances where portions of threshold 836 that extend more than the predetermined height above floor surface 808 (e.g., greater than ¼ inch) are not beveled, the surfaces can be set back from the lower adjacent surface of threshold 836 so that the outermost profile of the threshold does not rise any steeper than a certain slope. Referring to threshold sealing surface 866 in FIG. 8A, the rise is shown as vertical distance 854, and the run is shown as horizontal distance 860. In many instances, the rise:run ratio (e.g., the ratio of vertical distance 854 to horizontal distance 860) can be no greater than 1:2.

In some instances, the overall height of threshold 836 can be vertically adjustable. For example, during installation of the door system, shims 837 in threshold 836 can be positioned under threshold 836 to account for uneven floors. Vertical adjustment of threshold 836 may also ensure precise alignment of gasket 838 and threshold 836 to ensure proper gasket compression and overlap on threshold sealing surface 866 (e.g., ¼ inch surface) of threshold 836. Door panel 818 or door frame 100 can be adjusted vertically to enable precise positioning of gasket 838 onto threshold 836. The door system can optionally use commercial door hardware to allow the door system to function as a pedestrian door, or the door system can use custom or non-typical latching to secure door panel 818 into the closed position.

The door system may further include additional gaskets positioned elsewhere on door frame 100 and/or threshold 836 in order to further improve the seal provided by gasket 838. For instance, frame sealing surface 214 of frame strike side 402 and frame hinge side 404 of door frame 100 may include a frame gasket, and/or threshold sealing surface 866 of threshold 836 may include a threshold gasket.

In some example door systems disclosed herein, the threshold may not need to comply with the handicap accessible standards discussed elsewhere herein. For various reasons, such thresholds need not qualify as low thresholds for purposes of such regulations. In some such examples, the door system may be a cutout in a wall, and the threshold 836 may be secured to the lower edge of the cutout.

In the example of FIG. 8A, threshold sealing surface 866 is shown as a flat sealing surface, creating approximately a right angle (e.g., between 85 and 95 degrees) with floor surface 808. In some examples, threshold sealing surface 866 may form a different angle with floor surface 808. For instance, in the example of FIG. 8B, threshold sealing surface 866 is shown with a sloped surface. In other examples, the threshold may be rounded, crowned, ribbed, or formed in any other suitable shape.

The pedestrian door system also includes door panel 818 (which may be similar to door panel 318 of FIG. 3), which includes panel bottom side 820, panel strike side 322, panel hinge side 324, and gasket 838. Gasket 838 extends continuously along panel bottom side 820 and at least partially up each of panel strike side 322 and panel hinge side 324. In some instances, gasket 838 may extend between 3 feet and 8 feet up each of panel strike side 322 and panel hinge side 324. Gasket 838 may be either a one-piece gasket or multiple gasket segments contacting one another (e.g., bonded together). Gasket 838 may also be a bulb-type gasket with holes defined in a wet side wall of the continuous gasket. In such examples, the holes in gasket 838 are configured to receive liquid and/or air into an interior space within gasket 838. In some configurations, the gasket ends may not be open in the contained liquid. The gasket ends may be closed, or the open gasket ends may be above the contained liquid. In these configurations, the gasket interior is accessible only through the holes.

In instances in which gasket 838 is a bulb-type gasket with holes defined in the wet side wall, the gasket 838 may be attached to the door frame and threshold rather than to the door panel 818. Gasket 838 may be attached to the door frame along the frame sealing surface and to the threshold along the threshold sealing surface 866. In such instances, gasket 838 may also be continuous.

As shown in FIGS. 8A and 8B, door panel 818 consists of a main panel and door edge flange 840. In such instances, door edge flange 840 extends outwardly from door panel 818. The amount that door edge flange 840 extends from door panel 818 may vary, as may the thickness of door edge flange 840. Gasket 838 is then located adjacent to door edge flange 840, such as by being connected to door edge flange 840 or by being installed within a small distance from door edge flange 840 on panel bottom side 320 (e.g., within 5 millimeters).

Door panel 818 may include dry side panel 844 and wet side panel 846. In such instances, door edge flange 840 may extend outwardly from wet side panel 846. Door edge flange 840 may extend toward dry side panel 844 (e.g., less than 15% of the distance from wet side panel 846 to dry side panel 844, more than 50% of the distance from wet side panel 846 to dry side panel 844, etc.). In some examples, door edge flange 840 may extend outwardly from door panel 818, not at wet side panel 846, but somewhere between dry side panel 844 and wet side panel 846 (e.g., midway between dry side panel 844 and wet side panel 846). Gasket 838 may then extend from door edge flange 840 toward dry side panel 844 of door panel 818. When flood water is pressing against wet side panel 846, dry side panel 844 presses against the stop surface of the door frame. That reduces forces on door edge flange 840 so that door edge flange 840 can be constructed in a less robust manner. For example, wet side panel 846 may comprise a sheet of metal that is hemmed to create door edge flange 840.

Figure 9A:
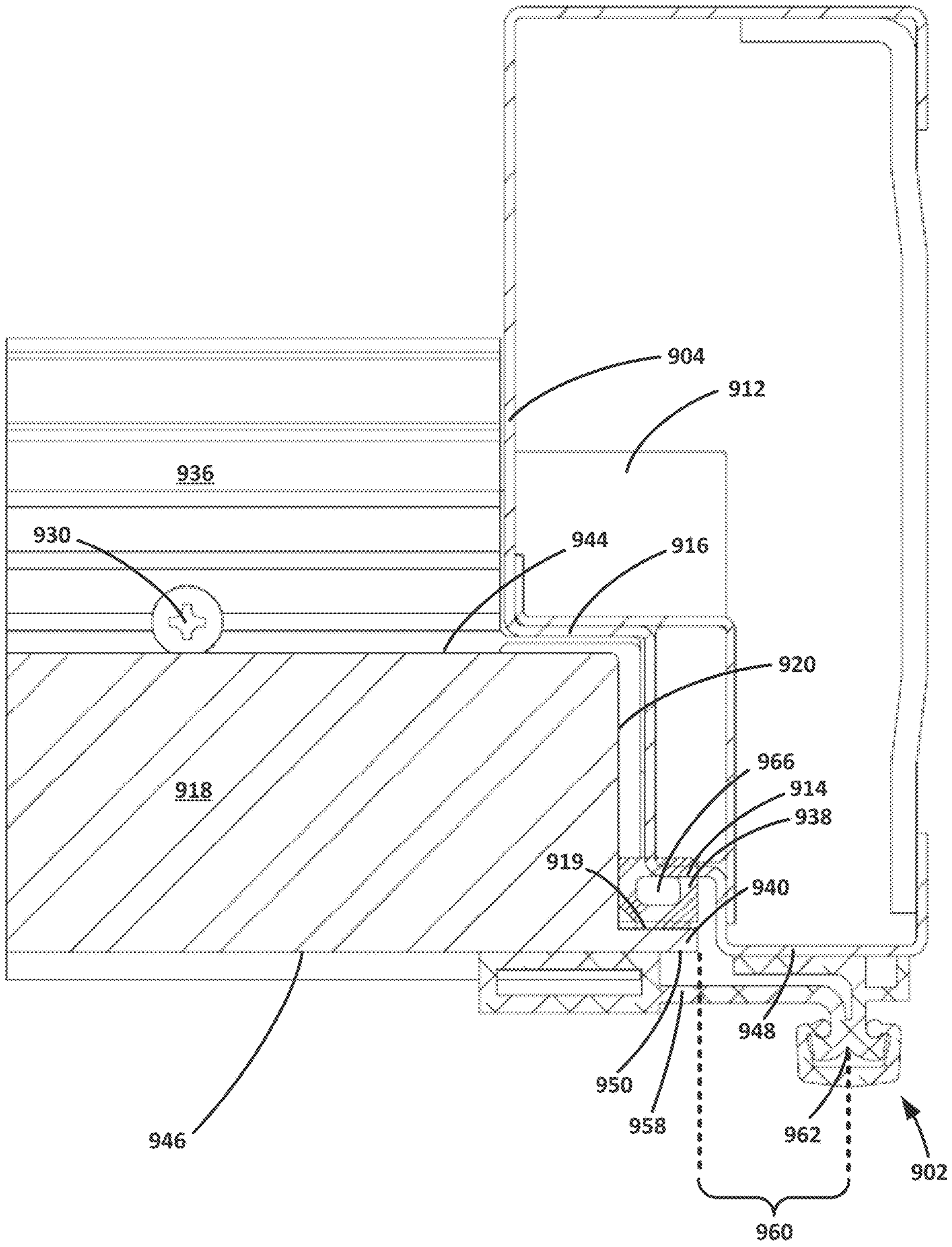
FIGS. 9A-9C are top section views of a door system that includes a hinge, a door panel, a continuous gasket, and a threshold, each configured in accordance with one or more aspects of this disclosure.
Figure 9B:
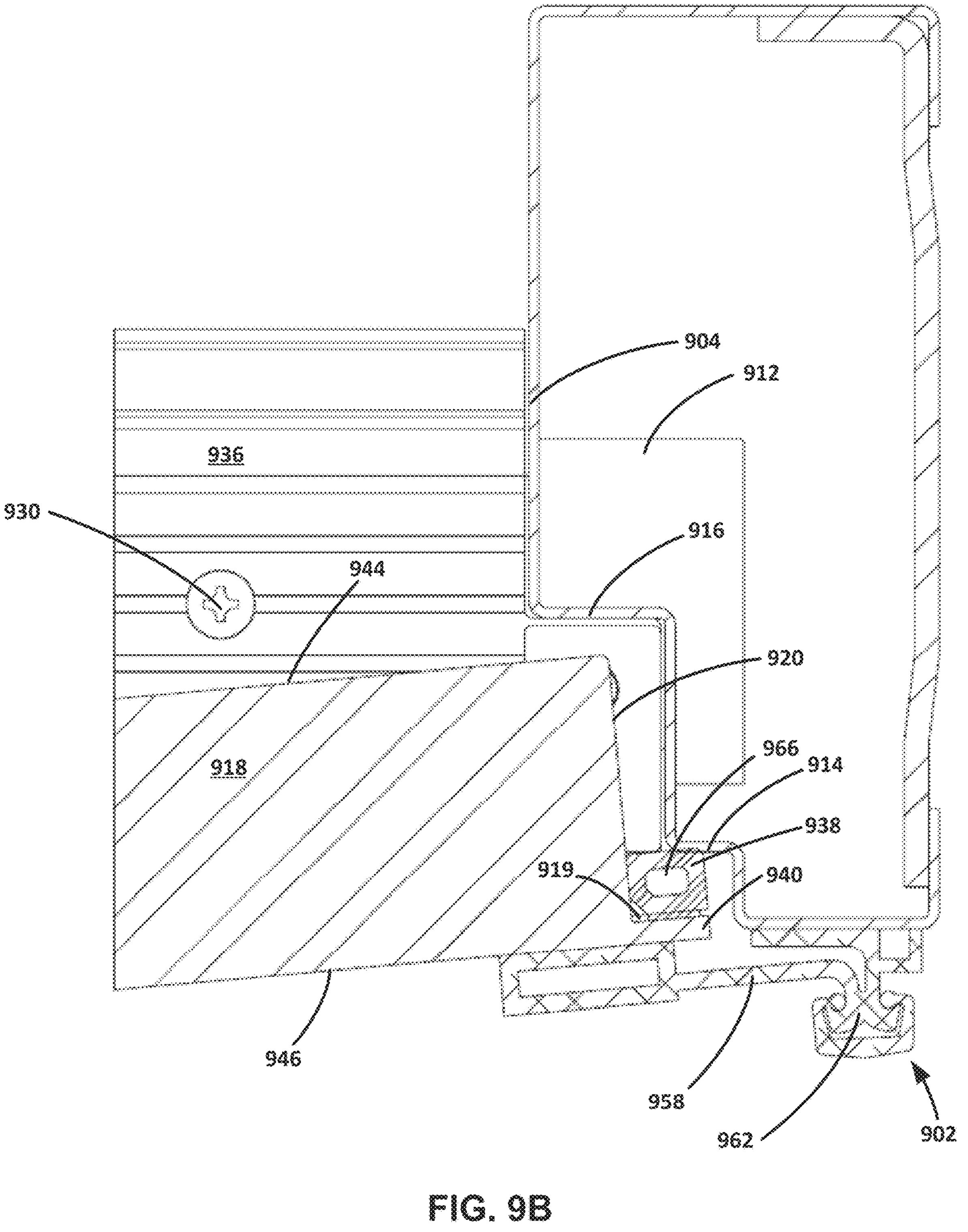
Figure 9C:
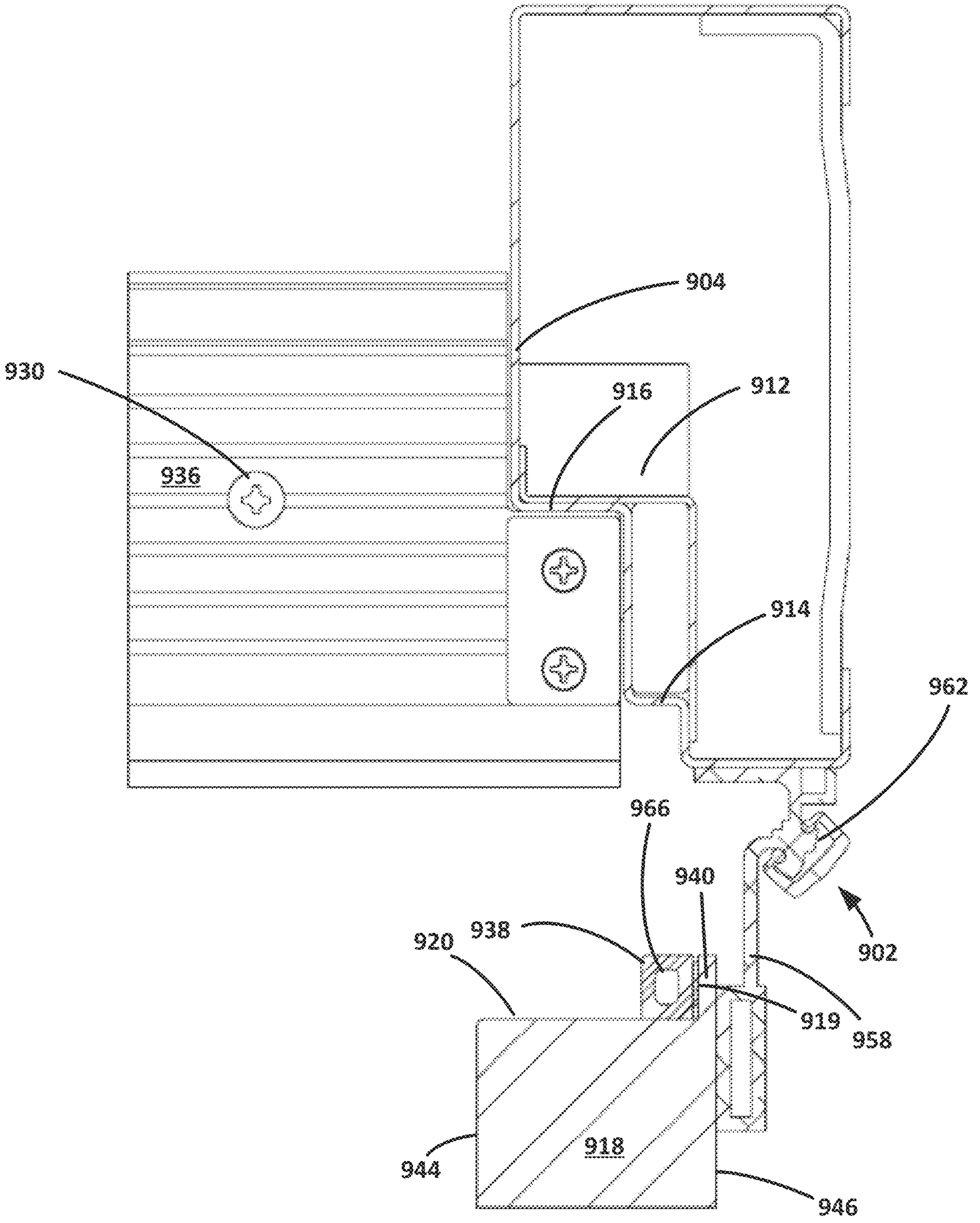

FIGS. 9A-9C show a door hinge 902 that can be used in illustrative pedestrian door systems. Door panel 918 includes door edge flange 940, which gasket 938 is attached to. Gasket 938 may be a bulb-type gasket, which includes hollow space 966. Threshold 936 is attached to a floor surface and frame base 912 with anchor bolt 930.

The door system described herein may use a custom aluminum geared hinge that fastens to the frame and the wet-side face of the door panel. Door hinge 902 can be a geared hinge configured to hingedly couple panel hinge side 920 of door panel 918 to frame hinge side 904 of the door frame. In some examples, the door hinge can be a piano hinge, a barrel hinge, or other suitable hinge. The door hinge 902 facilitates hinged movement of door panel 918 relative to the door frame between an open position and a closed position. When door panel 918 is in the closed position, gasket 938 is positioned between panel sealing surface 919 of door panel 918 and frame sealing surface 914 of frame strike side and frame hinge side 904 of the door frame to create a liquid-tight seal. When door panel 918 is in the closed position, gasket 938 is also positioned between the panel sealing surface (819 of FIG. 8A) and the threshold sealing surface (866 of FIG. 8A) of the threshold (836 of FIG. 8A) to create a liquid-tight seal.

In some instances, the door hinge 902 has a hinge leaf 958 that extends beyond door edge flange 940 and attaches to door panel 918. This hinge leaf 958 may also be a flexible hinge leaf. Door hinge 902 may be configured to facilitate hinged movement of door panel 918 relative to the door frame about a hinge axis (vertical) that is located outwardly from an outermost extent of door panel 918 by a particular distance. In some examples, that hinge offset 960 may be at least ⅝ inch. Door hinge 902 can be a surface mount hinge or a geared hinge or other hinge that fastens to wet side panel 946 and a wet side 948 of the door frame. The stationary portion of door hinge 902 may be attached to the wet side of door frame, and the hinge leaf 958 may extend some distance (generally parallel to the surface of door panel 918). The length and orientation of the hinge leaf 958 may allow liquid pressure on door panel 918 to deflect door panel 918 further into the door frame to increase compression of gasket 938 compression and can allow dry side panel 944 to contact the stop surface 916. Hinge leaf 958 may extend beyond door edge flange 940 so that hinge fasteners can be attached to the main door structure of door panel 918 rather than to door edge flange 940.

Door hinge 902 may be configured to facilitate hinged movement of door panel 918 relative to the door frame about hinge pivot 962. Hinge pivot 962 is located in a position such that, as door panel 918 moves into the closed position, gasket 938 moves more perpendicularly to frame sealing surface 914. If hinge pivot 962 were located closer to gasket 938, gasket 938 may roll into frame sealing surface 914 or compress laterally into frame sealing surface 914 rather than in being pressed onto frame sealing surface 914. Hinge pivot 962 may have a vertical axis.

The process of moving door panel 918 from the closed position to the open position is shown in the sequence of FIGS. 9A-9C. In the example of FIG. 9A, door panel 918 is in the closed position. In some examples, when door panel 918 is in the closed position, the wet side 950 of door edge flange 940 and wet side panel 946 may be within 1/16 inch of flush with wet side 948 of the door frame. In FIG. 9B, door panel 918 begins to open as hinge leaf 958 and door panel 918 rotate around hinge pivot 962. In FIG. 9C, door panel 918 is in the open position, with hinge pivot 962 extending door panel 918 away from the frame, protecting the frame and gasket 938. Looking at FIG. 9C, then FIG. 9B, then FIG. 9A shows door panel 918 swinging into the closed position.

When door panel 918 is in the closed position, the flexible hinge leaf 958 is configured to allow movement of door panel 918 relative to the door frame (perpendicular to door panel surface) when pressure is applied to wet side panel 946. This is particularly advantageous at the hinge-side of the door system where this feature allows additional gasket compression to be achieved with increasing amounts of pressure on door panel 918.

In some instances, the door frame includes stop surface 916 that is separate from frame sealing surface 914. In such instances, when door panel 918 is in a closed position, dry side panel 944 is adjacent to stop surface 916. As liquid presses on wet side panel 946, dry side panel 944 presses against stop surface 916. Such pressures need not be borne by the door edge flange or by the hinge components, which is beneficial in examples involving a more rigid hinge (e.g., a butt hinge).

Example door systems include door hinges that allow for hinged movement of the door panel relative to the door frame between open and closed positions. In some instances, the door hinge may be configured to hingedly couple a side of the door panel to the door frame. In such instances, the door panel may move between open and closed positions about a vertical hinge axis. In some instances, the door hinge may be configured to hingedly couple the bottom of the door panel to the door frame. In such instances, the door panel may move between open and closed positions about a horizontal hinge axis.

Figure 10:
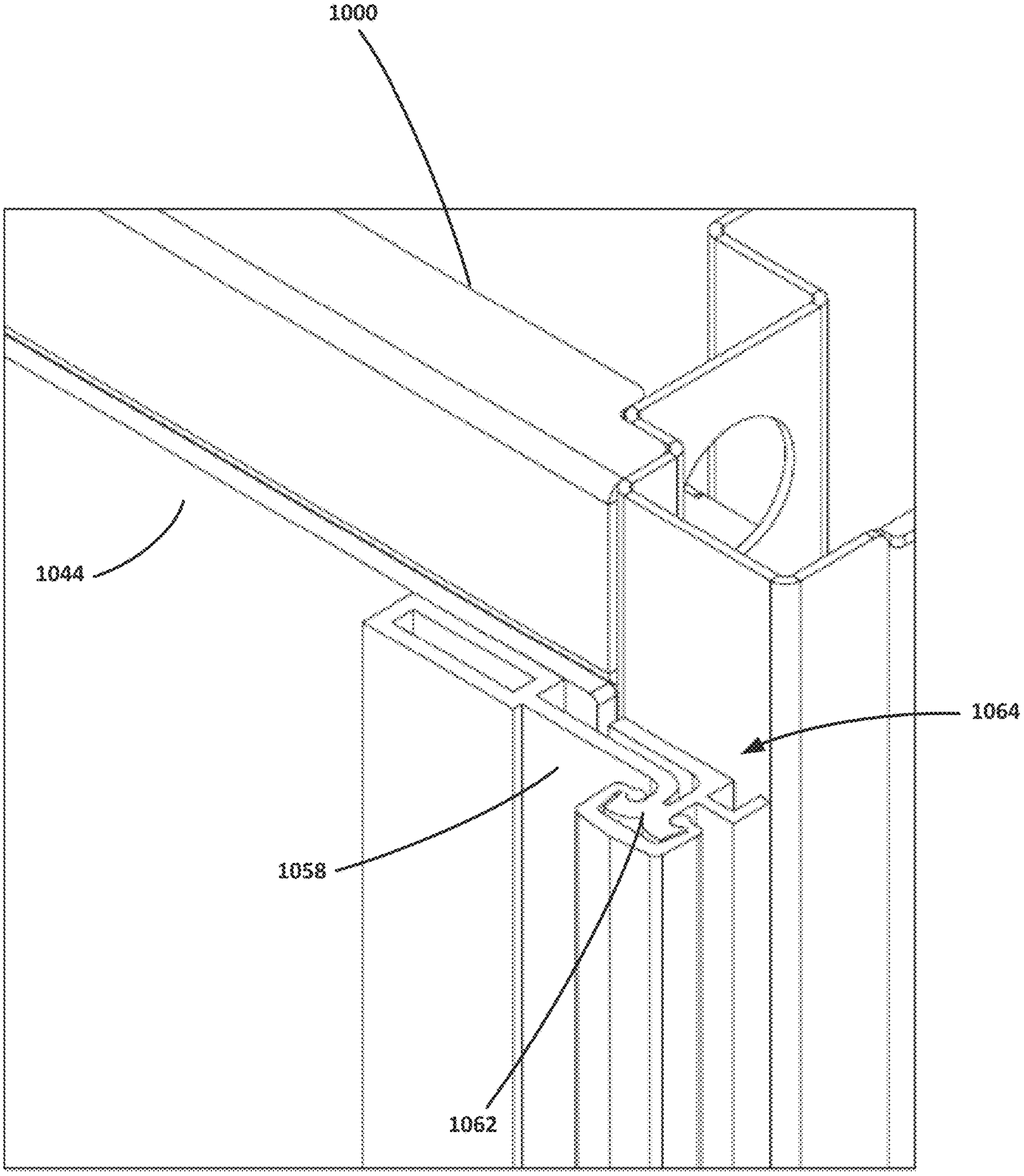
FIG. 10 is a perspective view of a hinge of a door system configured in accordance with one or more aspects of this disclosure.
Figure 11:
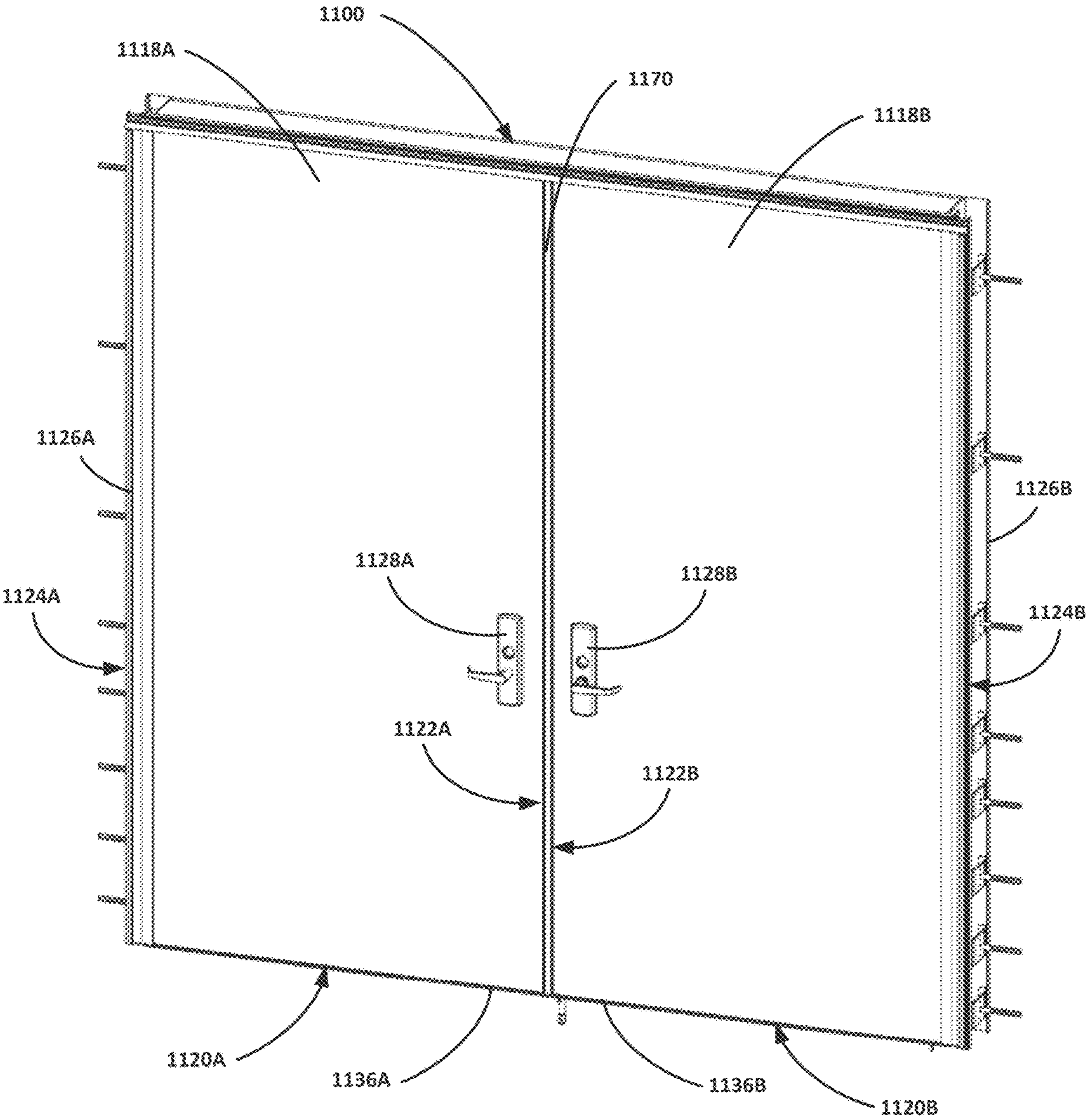
FIG. 11 is a perspective view of a door system that includes two door panels, a center post, and a door frame, each configured in accordance with one or more aspects of this disclosure.

FIG. 10 illustrates geared hinge 1064 and door frame 1000 of a door system configured in accordance with one or more aspects of this disclosure. The length, material, and thickness of hinge leaf 1058 that extends onto wet side panel 1044 is designed so that liquid pressure on the door can flex the hinge material so that the door system is able to achieve increased gasket compression as liquid levels rise higher on the door. Hinge pivot 1062 and hinge leaf 1058 can rebound after flood conditions recede without resulting in permanent deflection or damage to geared hinge 1064.

The pedestrian door system may also be a double door system. FIG. 11 illustrates a door system that includes two door panels 1118A and 1118B, center post 1170, and door frame 1100, each configured in accordance with one or more aspects of this disclosure. Each of door panels 1118A and 1118B may be similar to, and may be constructed of similar materials as, any of door panels described herein.

Door frame 1100 may include openings for each of door panels 1118A and 1118B. Door frame 1100 may comprise frame strike sides on each side of center post 1170. Door frame 1100 may include first frame hinge side 1126A, and a first frame sealing surface that extends at least partially up each of the first side of center post 1170 and first frame hinge side 1126A. Door frame 1100 may also include second frame hinge side 1126B and a second frame sealing surface that extends at least partially up each of another side of center post 1170 and second frame hinge side 1126B.

The door system may include two thresholds with characteristics like those of other thresholds described herein. The door system may include first threshold 1136A, which extends between the first side of center post 1170 and first frame hinge side 1126A. First threshold 1136A includes a base configured to be secured to a floor surface and a threshold sealing surface. The door system can include second threshold 1136B configured to extend between center post 1170 and second frame hinge side 1126B, with second threshold 1136B having dimensions like those of first threshold 1136A.

As noted, first door panel 1118A and second door panel 1118B may be similar to other door panels described herein. First door panel 1118A may include first panel bottom side 1120A, first panel strike side 1122A, first panel hinge side 1124A, and a continuous gasket extending continuously along first panel bottom side 1120A and at least partially up each of first panel strike side 1122A and first panel hinge side 1124A. Second door panel 1118B may include second panel bottom side 1120B, second panel strike side 1122B, second panel hinge side 1124B, and a second continuous gasket extending continuously along second panel bottom side 1120B and at least partially up each of second panel strike side 1122B and second panel hinge side 1124B.

The door system may include first and second hinges. The first hinge may be configured to hingedly couple first panel hinge side 1124A of first door panel 1118A to first frame hinge side 1126A of door frame 1100. The first door hinge can facilitate hinged movement first door panel 1118A relative to door frame 1100 between an open position and a first closed position. When in the first closed position, the continuous gasket of first door panel 1118A seals against the frame sealing surface of door frame 1100 and against the threshold sealing surface of the threshold in a liquid-tight manner. The second hinge may be configured to hingedly couple second panel hinge side 1124B of second door panel 1118B to second frame hinge side 1126B of door frame 1100. The second door hinge can facilitate hinged movement of second door panel 1118B relative to door frame 1100 between a second open position and a second closed position. When in the second closed position, the continuous gasket of second door panel 1118B seals against the second frame sealing surface of door frame 1100 in a liquid-tight manner.

It is to be recognized that depending on the example, certain acts or events of any of the techniques described herein can be performed in a different sequence, may be added, merged, or left out altogether (e.g., not all described acts or events are necessary for the practice of the techniques). Various examples of the disclosure have been described. Any combination of the described systems, operations, or functions is contemplated. These and other examples are within the scope of the following claims.

What is claimed is:

1. A pedestrian flood door system, comprising:

a door frame comprising a frame strike side, a frame hinge side, a frame stop surface, a frame sealing surface, and a hinge mounting surface, wherein the frame stop surface, the frame sealing surface, and the hinge mounting surface are non-coplanar with each other;

a threshold configured to extend between the frame strike side and the frame hinge side, the threshold including:

a base configured to be secured to a floor surface, and a threshold sealing surface that extends vertically upwardly from the base;

a door panel including:

a main panel that comprises a panel wet side, a panel dry side, a panel bottom side, a panel strike side, and a panel hinge side, a door edge flange that extends outwardly from the main panel and that comprises a flange wet side and a flange dry side, the flange wet side being coplanar with the panel wet side, and a gasket in contact with the flange dry side and extending along the panel bottom side and extending at least partially up each of the panel strike side and the panel hinge side; and a door hinge configured to hingedly couple the panel hinge side of the door panel to the hinge mounting surface of the frame hinge side of the door frame and to facilitate hinged movement of the door panel relative to the door frame between an open position and a closed position, wherein, in the closed position, the panel dry side is proximate to the frame stop surface of the door frame, and the gasket is squeezed between the door edge flange and the frame sealing surface and between the door edge flange and the threshold sealing surface to create a flood barrier.

2. The pedestrian flood door system of claim 1, wherein the gasket is further in contact with the panel bottom side.

3. The pedestrian flood door system of claim 1, wherein the gasket extends out to a flange outer edge along the panel bottom side.

4. The pedestrian flood door system of claim 3, wherein the gasket extends beyond the flange outer edge along the panel bottom side.

5. The pedestrian flood door system of claim 1, wherein the threshold further includes a first raised portion adjacent the frame strike side and a second raised portion adjacent the frame hinge side, the first raised portion and the second raised portion forming part of the threshold sealing surface in corners where the threshold meets the door frame.

6. The pedestrian flood door system of claim 1, wherein the door frame further comprises a frame top side, and the frame sealing surface extends along an entirety of the frame strike side, the frame top side, and the frame hinge side, and wherein the door panel further comprises a panel top side, and the gasket extends continuously along an entirety of the panel strike side, the panel top side, the panel hinge side, and the panel bottom side.

7. The pedestrian flood door system of claim 1, wherein the gasket extends between 3 feet and 8 feet up each of the panel strike side and the panel hinge side.

8. The pedestrian flood door system of claim 1, wherein all portions of the threshold that are configured to extend at least ¼ inch above the floor surface have a rise: run ratio of no greater than 1:2.

9. The pedestrian flood door system of claim 1, wherein an overall height of the threshold is vertically adjustable.

10. The pedestrian flood door system of claim 1, wherein the panel wet side comprises a sheet of metal that is hemmed to create the door edge flange.

11. The pedestrian flood door system of claim 1, wherein the flange wet side and the panel wet side are within 1/16 inch of flush with a wet side of the door frame when the door panel is in the closed position.

12. The pedestrian flood door system of claim 1, wherein the door hinge comprises a hinge leaf that extends beyond the door edge flange and attaches to the main panel.

13. The pedestrian flood door system of claim 1, wherein the door hinge comprises a flexible hinge leaf.

14. The pedestrian flood door system of claim 13, wherein, in the closed position, the flexible hinge leaf allows the gasket to compress under liquid loading.

15. The pedestrian flood door system of claim 14, wherein, under liquid loading, compression of the gasket is limited by the panel dry side making contact with the frame stop surface.

16. The pedestrian flood door system of claim 1, wherein the gasket comprises a bulb-type gasket with holes defined in a wet side wall of the gasket, the holes being configured to receive liquid and/or air into an interior space within the bulb-type gasket.

17. The pedestrian flood door system of claim 1, wherein the door hinge is configured to facilitate hinged movement of the door panel relative to the door frame about a hinge axis that is located outwardly from an outermost extent of the door panel by at least ⅝ inch.

18. The pedestrian flood door system of claim 1, wherein the frame stop surface, the frame sealing surface, and the hinge mounting surface are parallel to each other.

19. The pedestrian flood door system of claim 1, wherein, in the closed position, a portion of the panel dry side adjacent the panel strike side is proximate to the frame stop surface of the door frame.

20. The pedestrian flood door system of claim 1, wherein the threshold sealing surface extends vertically upwardly from the base by a distance that is no greater than ¼ inch.

* * * * *